(12) United States Patent
Geisner et al.

(10) Patent No.: US 8,451,278 B2
(45) Date of Patent: May 28, 2013

(54) DETERMINE INTENDED MOTIONS

(75) Inventors: Kevin Geisner, Seattle, WA (US); Relja Markovic, Seattle, WA (US); Stephen Gilchrist Latta, Seattle, WA (US); Gregory Nelson Snook, Sammamish, WA (US); Kudo Tsunoda, Seattle, WA (US); Darren Alexander Bennett, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/566,939

(22) Filed: Aug. 3, 2012

(65) Prior Publication Data

US 2012/0293518 A1     Nov. 22, 2012

Related U.S. Application Data

(63) Continuation of application No. 12/434,532, filed on May 1, 2009, now Pat. No. 8,253,746.

(51) Int. Cl.
 *G06T 13/00*     (2011.01)

(52) U.S. Cl.
 USPC .......................................... 345/474; 715/863

(58) Field of Classification Search
 USPC .......................................... 345/474; 715/863
 See application file for complete search history.

(56) References Cited

U.S. PATENT DOCUMENTS

| | | | |
|---|---|---|---|
| 4,627,620 A | 12/1986 | Yang | |
| 4,630,910 A | 12/1986 | Ross et al. | |
| 4,645,458 A | 2/1987 | Williams | |
| 4,695,953 A | 9/1987 | Blair et al. | |
| 4,702,475 A | 10/1987 | Elstein et al. | |
| 4,711,543 A | 12/1987 | Blair et al. | |
| 4,751,642 A | 6/1988 | Silva et al. | |
| 4,796,997 A | 1/1989 | Svetkoff et al. | |
| 4,809,065 A | 2/1989 | Harris et al. | |
| 4,817,950 A | 4/1989 | Goo | |

(Continued)

FOREIGN PATENT DOCUMENTS

| CN | 101254344 B | 6/2010 |
|---|---|---|
| EP | 0583061 A2 | 2/1994 |

(Continued)

OTHER PUBLICATIONS

"Simulation and Training", 1994, Division Incorporated.

(Continued)

*Primary Examiner* — Jeffery A Brier
(74) *Attorney, Agent, or Firm* — Woodcock Washburn LLP

(57) ABSTRACT

It may be desirable to apply corrective data to aspects of captured image or the user-performed gesture for display of a visual representation that corresponds to the corrective data. The captured motion may be any motion in the physical space that is captured by the capture device, such as a camera. Aspects of a skeletal or mesh model of a person, that is generated based on the image data captured by the capture device, may be modified prior to animation. The modification may be made to the model generated from image data that represents a target or a target's motion, including user gestures, in the physical space. For example, certain joints of a skeletal model may be readjusted or realigned. A model of a target may be modified by applying differential correction, magnetism principles, binary snapping, confining virtual movement to defined spaces, or the like.

20 Claims, 12 Drawing Sheets

U.S. PATENT DOCUMENTS

| | | | |
|---|---|---|---|
| 4,843,568 A | 6/1989 | Krueger et al. | |
| 4,893,183 A | 1/1990 | Nayar | |
| 4,901,362 A | 2/1990 | Terzian | |
| 4,925,189 A | 5/1990 | Braeunig | |
| 5,101,444 A | 3/1992 | Wilson et al. | |
| 5,148,154 A | 9/1992 | MacKay et al. | |
| 5,184,295 A | 2/1993 | Mann | |
| 5,229,754 A | 7/1993 | Aoki et al. | |
| 5,229,756 A | 7/1993 | Kosugi et al. | |
| 5,239,463 A | 8/1993 | Blair et al. | |
| 5,239,464 A | 8/1993 | Blair et al. | |
| 5,288,078 A | 2/1994 | Capper et al. | |
| 5,295,491 A | 3/1994 | Gevins | |
| 5,320,538 A | 6/1994 | Baum | |
| 5,347,306 A | 9/1994 | Nitta | |
| 5,385,519 A | 1/1995 | Hsu et al. | |
| 5,405,152 A | 4/1995 | Katanics et al. | |
| 5,417,210 A | 5/1995 | Funda et al. | |
| 5,423,554 A | 6/1995 | Davis | |
| 5,454,043 A | 9/1995 | Freeman | |
| 5,469,740 A | 11/1995 | French et al. | |
| 5,495,576 A | 2/1996 | Ritchey | |
| 5,516,105 A | 5/1996 | Eisenbrey et al. | |
| 5,524,637 A | 6/1996 | Erickson | |
| 5,534,917 A | 7/1996 | MacDougall | |
| 5,563,988 A | 10/1996 | Maes et al. | |
| 5,577,981 A | 11/1996 | Jarvik | |
| 5,580,249 A | 12/1996 | Jacobsen et al. | |
| 5,594,469 A | 1/1997 | Freeman et al. | |
| 5,597,309 A | 1/1997 | Riess | |
| 5,616,078 A | 4/1997 | Oh | |
| 5,617,312 A | 4/1997 | Iura et al. | |
| 5,638,300 A | 6/1997 | Johnson | |
| 5,641,288 A | 6/1997 | Zaenglein | |
| 5,682,196 A | 10/1997 | Freeman | |
| 5,682,229 A | 10/1997 | Wangler | |
| 5,690,582 A | 11/1997 | Ulrich et al. | |
| 5,703,367 A | 12/1997 | Hashimoto et al. | |
| 5,704,837 A | 1/1998 | Iwasaki et al. | |
| 5,715,834 A | 2/1998 | Bergamasco et al. | |
| 5,875,108 A | 2/1999 | Hoffberg et al. | |
| 5,877,803 A | 3/1999 | Wee et al. | |
| 5,913,727 A | 6/1999 | Ahdoot | |
| 5,933,125 A | 8/1999 | Fernie | |
| 5,980,256 A | 11/1999 | Carmein | |
| 5,989,157 A | 11/1999 | Walton | |
| 5,995,649 A | 11/1999 | Marugame | |
| 6,005,548 A | 12/1999 | Latypov et al. | |
| 6,009,210 A | 12/1999 | Kang | |
| 6,054,991 A | 4/2000 | Crane et al. | |
| 6,057,859 A * | 5/2000 | Handelman et al. | 345/474 |
| 6,057,909 A | 5/2000 | Yahav et al. | |
| 6,066,075 A | 5/2000 | Poulton | |
| 6,072,494 A | 6/2000 | Nguyen | |
| 6,073,489 A | 6/2000 | French et al. | |
| 6,077,201 A | 6/2000 | Cheng et al. | |
| 6,098,458 A | 8/2000 | French et al. | |
| 6,100,517 A | 8/2000 | Yahav et al. | |
| 6,100,896 A | 8/2000 | Strohecker et al. | |
| 6,101,289 A | 8/2000 | Kellner | |
| 6,128,003 A | 10/2000 | Smith et al. | |
| 6,130,677 A | 10/2000 | Kunz | |
| 6,141,463 A | 10/2000 | Covell et al. | |
| 6,147,678 A | 11/2000 | Kumar et al. | |
| 6,152,856 A | 11/2000 | Studor et al. | |
| 6,159,100 A | 12/2000 | Smith | |
| 6,173,066 B1 | 1/2001 | Peurach et al. | |
| 6,181,343 B1 | 1/2001 | Lyons | |
| 6,188,777 B1 | 2/2001 | Darrell et al. | |
| 6,191,798 B1 * | 2/2001 | Handelman et al. | 345/473 |
| 6,215,890 B1 | 4/2001 | Matsuo et al. | |
| 6,215,898 B1 | 4/2001 | Woodfill et al. | |
| 6,226,396 B1 | 5/2001 | Marugame | |
| 6,229,913 B1 | 5/2001 | Nayar et al. | |
| 6,256,033 B1 | 7/2001 | Nguyen | |
| 6,256,400 B1 | 7/2001 | Takata et al. | |
| 6,283,860 B1 | 9/2001 | Lyons et al. | |
| 6,289,112 B1 | 9/2001 | Jain et al. | |
| 6,299,308 B1 | 10/2001 | Voronka et al. | |
| 6,308,565 B1 | 10/2001 | French et al. | |
| 6,316,934 B1 | 11/2001 | Amorai-Moriya et al. | |
| 6,363,160 B1 | 3/2002 | Bradski et al. | |
| 6,384,819 B1 | 5/2002 | Hunter | |
| 6,411,744 B1 | 6/2002 | Edwards | |
| 6,430,997 B1 | 8/2002 | French et al. | |
| 6,476,834 B1 | 11/2002 | Doval et al. | |
| 6,496,598 B1 | 12/2002 | Harman | |
| 6,498,628 B2 | 12/2002 | Iwamura | |
| 6,502,515 B2 | 1/2003 | Burckhardt et al. | |
| 6,503,195 B1 | 1/2003 | Keller et al. | |
| 6,512,838 B1 | 1/2003 | Rafii et al. | |
| 6,539,931 B2 | 4/2003 | Trajkovic et al. | |
| 6,570,555 B1 | 5/2003 | Prevost et al. | |
| 6,633,294 B1 | 10/2003 | Rosenthal et al. | |
| 6,640,202 B1 | 10/2003 | Dietz et al. | |
| 6,661,918 B1 | 12/2003 | Gordon et al. | |
| 6,674,877 B1 | 1/2004 | Jojic et al. | |
| 6,681,031 B2 | 1/2004 | Cohen et al. | |
| 6,714,665 B1 | 3/2004 | Hanna et al. | |
| 6,731,799 B1 | 5/2004 | Sun et al. | |
| 6,738,066 B1 | 5/2004 | Nguyen | |
| 6,765,726 B2 | 7/2004 | French et al. | |
| 6,771,277 B2 | 8/2004 | Ohba | |
| 6,788,809 B1 | 9/2004 | Grzeszczuk et al. | |
| 6,801,637 B2 | 10/2004 | Voronka et al. | |
| 6,873,723 B1 | 3/2005 | Aucsmith et al. | |
| 6,876,496 B2 | 4/2005 | French et al. | |
| 6,937,742 B2 | 8/2005 | Roberts et al. | |
| 6,950,534 B2 | 9/2005 | Cohen et al. | |
| 7,003,134 B1 | 2/2006 | Covell et al. | |
| 7,006,236 B2 | 2/2006 | Tomasi et al. | |
| 7,036,094 B1 | 4/2006 | Cohen et al. | |
| 7,038,855 B2 | 5/2006 | French et al. | |
| 7,039,676 B1 | 5/2006 | Day et al. | |
| 7,042,440 B2 | 5/2006 | Pryor et al. | |
| 7,050,177 B2 | 5/2006 | Tomasi et al. | |
| 7,050,606 B2 | 5/2006 | Paul et al. | |
| 7,058,204 B2 | 6/2006 | Hildreth et al. | |
| 7,060,957 B2 | 6/2006 | Lange et al. | |
| 7,113,918 B1 | 9/2006 | Ahmad et al. | |
| 7,121,946 B2 | 10/2006 | Paul et al. | |
| 7,151,530 B2 | 12/2006 | Roeber et al. | |
| 7,170,492 B2 | 1/2007 | Bell | |
| 7,184,048 B2 | 2/2007 | Hunter | |
| 7,202,898 B1 | 4/2007 | Braun et al. | |
| 7,222,078 B2 | 5/2007 | Abelow | |
| 7,224,384 B1 | 5/2007 | Iddan et al. | |
| 7,227,526 B2 | 6/2007 | Hildreth et al. | |
| 7,259,747 B2 | 8/2007 | Bell | |
| 7,293,356 B2 | 11/2007 | Sohn et al. | |
| 7,308,112 B2 | 12/2007 | Fujimura et al. | |
| 7,310,431 B2 | 12/2007 | Gokturk et al. | |
| 7,317,836 B2 | 1/2008 | Fujimura et al. | |
| 7,340,077 B2 | 3/2008 | Gokturk et al. | |
| 7,348,963 B2 | 3/2008 | Bell | |
| 7,359,121 B2 | 4/2008 | French et al. | |
| 7,367,887 B2 | 5/2008 | Watabe et al. | |
| 7,379,563 B2 | 5/2008 | Shamaie | |
| 7,379,566 B2 | 5/2008 | Hildreth | |
| 7,389,591 B2 | 6/2008 | Jaiswal et al. | |
| 7,412,077 B2 | 8/2008 | Li et al. | |
| 7,421,093 B2 | 9/2008 | Hildreth et al. | |
| 7,430,312 B2 | 9/2008 | Gu | |
| 7,436,496 B2 | 10/2008 | Kawahito | |
| 7,450,736 B2 | 11/2008 | Yang et al. | |
| 7,452,275 B2 | 11/2008 | Kuraishi | |
| 7,460,690 B2 | 12/2008 | Cohen et al. | |
| 7,489,812 B2 | 2/2009 | Fox et al. | |
| 7,536,032 B2 | 5/2009 | Bell | |
| 7,555,142 B2 | 6/2009 | Hildreth et al. | |
| 7,560,701 B2 | 7/2009 | Oggier et al. | |
| 7,570,805 B2 | 8/2009 | Gu | |
| 7,574,020 B2 | 8/2009 | Shamaie | |
| 7,576,727 B2 | 8/2009 | Bell | |
| 7,590,262 B2 | 9/2009 | Fujimura et al. | |
| 7,593,552 B2 | 9/2009 | Higaki et al. | |
| 7,598,942 B2 | 10/2009 | Underkoffler et al. | |

| | | |
|---|---|---|
| 7,607,509 B2 | 10/2009 | Schmiz et al. |
| 7,620,202 B2 | 11/2009 | Fujimura et al. |
| 7,668,340 B2 | 2/2010 | Cohen et al. |
| 7,680,298 B2 | 3/2010 | Roberts et al. |
| 7,683,954 B2 | 3/2010 | Ichikawa et al. |
| 7,684,592 B2 | 3/2010 | Paul et al. |
| 7,701,439 B2 | 4/2010 | Hillis et al. |
| 7,702,130 B2 | 4/2010 | Im et al. |
| 7,704,135 B2 | 4/2010 | Harrison, Jr. |
| 7,710,391 B2 | 5/2010 | Bell et al. |
| 7,729,530 B2 | 6/2010 | Antonov et al. |
| 7,746,345 B2 | 6/2010 | Hunter |
| 7,760,182 B2 | 7/2010 | Ahmad et al. |
| 7,809,167 B2 | 10/2010 | Bell |
| 7,834,846 B1 | 11/2010 | Bell |
| 7,852,262 B2 | 12/2010 | Namineni et al. |
| RE42,256 E | 3/2011 | Edwards |
| 7,898,522 B2 | 3/2011 | Hildreth et al. |
| 8,035,612 B2 | 10/2011 | Bell et al. |
| 8,035,614 B2 | 10/2011 | Bell et al. |
| 8,035,624 B2 | 10/2011 | Bell et al. |
| 8,072,470 B2 | 12/2011 | Marks |
| 8,253,746 B2 * | 8/2012 | Geisner et al. ............... 345/474 |
| 2004/0207597 A1 | 10/2004 | Marks |
| 2005/0059488 A1 | 3/2005 | Larsen et al. |
| 2006/0187305 A1 | 8/2006 | Trivedi et al. |
| 2006/0188144 A1 | 8/2006 | Sasaki et al. |
| 2006/0239558 A1 | 10/2006 | Rafii et al. |
| 2007/0013718 A1 | 1/2007 | Ohba |
| 2007/0060336 A1 | 3/2007 | Marks et al. |
| 2007/0098222 A1 | 5/2007 | Porter et al. |
| 2007/0216894 A1 | 9/2007 | Garcia et al. |
| 2007/0259717 A1 | 11/2007 | Mattice et al. |
| 2007/0260984 A1 | 11/2007 | Marks et al. |
| 2007/0279485 A1 | 12/2007 | Ohba et al. |
| 2007/0283296 A1 | 12/2007 | Nilsson |
| 2007/0298882 A1 | 12/2007 | Marks et al. |
| 2008/0001951 A1 | 1/2008 | Marks et al. |
| 2008/0026838 A1 | 1/2008 | Dunstan et al. |
| 2008/0062257 A1 | 3/2008 | Corson |
| 2008/0100620 A1 | 5/2008 | Nagai et al. |
| 2008/0125678 A1 | 5/2008 | Breen |
| 2008/0126937 A1 | 5/2008 | Pachet |
| 2008/0134102 A1 | 6/2008 | Movold et al. |
| 2008/0152191 A1 | 6/2008 | Fujimura et al. |
| 2008/0215972 A1 | 9/2008 | Zalewski et al. |
| 2008/0215973 A1 | 9/2008 | Zalewski et al. |
| 2009/0141933 A1 | 6/2009 | Wagg |
| 2009/0167679 A1 | 7/2009 | Klier et al. |
| 2009/0221368 A1 | 9/2009 | Yen et al. |

FOREIGN PATENT DOCUMENTS

| | | |
|---|---|---|
| JP | 08044490 A | 2/1996 |
| WO | WO 93/10708 A1 | 6/1993 |
| WO | WO 97/17598 A1 | 5/1997 |
| WO | WO 99/15863 A1 | 4/1999 |
| WO | WO 99/44698 A1 | 9/1999 |
| WO | WO 01/59975 A3 | 1/2002 |
| WO | WO 02/082249 A2 | 10/2002 |
| WO | WO 03/001722 A3 | 3/2003 |
| WO | WO 03/046706 A1 | 6/2003 |
| WO | WO 03/073359 A3 | 11/2003 |
| WO | WO 03/054683 A3 | 12/2003 |
| WO | WO 03/071410 A3 | 3/2004 |
| WO | WO 2009/059065 A1 | 5/2009 |

OTHER PUBLICATIONS

"Virtual High Anxiety", Tech Update, Aug. 1995, pp. 22.

Aggarwal et al., "Human Motion Analysis: A Review", IEEE Nonrigid and Articulated Motion Workshop, 1997, University of Texas at Austin, Austin, TX.

Arvo et al., "Fluid Sketches: Continuous Recognition and Morphing of Simple HandDrawn Shapes", Nov. 17, 2008, 6 pages.

Avery et al., "Outdoor Augmented Reality Gaming on Five Dollars a Day", ACM International Conference Proceeding Series, Proceedings of the Sixth Australasian conference on User interface, Newcastle, Australia, (no month available), 2005, 40, 10 pages.

Azarbayejani et al., "Visually Controlled Graphics", Jun. 1993, vol. 15, No. 6, IEEE Transactions on Pattern Analysis and Machine Intelligence.

Benbasat, "An Inertial Measurement Unit for User Interfaces", Submitted to the Program in Media Arts and Sciences, School of Architecture and Planning, in partial fulfillment of the requirements for the degree of Master of Science in Media Arts and Sciences at the Massachusetts Institute of Technology, Sep. 8, 2000, 1-135.

Breen et al., "Interactive Occlusion and Collusion of Real and Virtual Objects in Augmented Reality", Technical Report ECRC-95-02, 1995, European Computer-Industry Research Center GmbH, Munich, Germany.

Brogan et al., "Dynamically Simulated Characters in Virtual Environments", Sep./Oct. 1998, pp. 2-13, vol. 18, Issue 5, IEEE Computer Graphics and Applications.

Fisher et al., "Virtual Environment Display System", ACM Workshop on Interactive 3D Graphics, Oct. 1986, Chapel Hill, NC.

Freeman et al., "Television Control by Hand Gestures", Dec. 1994, Mitsubishi Electric Research Laboratories, TR94-24, Caimbridge, MA.

Granieri et al., "Simulating Humans in VR", The British Computer Society, Oct. 1994, Academic Press.

Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.

He, "Generation of Human Body Models", Apr. 2005, University of Auckland, New Zealand.

Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.

Isard et al., "Condensation—Conditional Density Propagation for Visual Tracking", 1998, pp. 5-28, International Journal of Computer Vision 29(1), Netherlands.

Kanade et al., "A Stereo Machine for Video-rate Dense Depth Mapping and Its New Applications", IEEE Computer Society Conference on Computer Vision and Pattern Recognition, 1996, pp. 196-202,The Robotics Institute, Carnegie Mellon University, Pittsburgh, PA.

Kohler, "Special Topics of Gesture Recognition Applied in Intelligent Home Environments", in Proceedings of the Gesture Workshop, 1998, pp. 285-296, Germany.

Kohler, "Technical Details and Ergonomical Aspects of Gesture Recognition applied in Intelligent Home Environments", 1997, Germany.

Kohler, "Vision Based Remote Control in Intelligent Home Environments", University of Erlangen-Nuremberg/Germany, 1996, pp. 147-154, Germany.

Livingston, "Vision-based Tracking with Dynamic Structured Light for Video See-through Augmented Reality", 1998, University of North Carolina at Chapel Hill, North Carolina, USA.

Miyagawa et al., "CCD-Based Range Finding Sensor", Oct. 1997, pp. 1648-1652, vol. 44 No. 10, IEEE Transactions on Electron Devices.

Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.

Qian et al., "A Gesture-Driven Multimodal Interactive Dance System", Jun. 2004, pp. 1579-1582, IEEE International Conference on Multimedia and Expo (ICME), Taipei, Taiwan.

Rosenhahn et al., "Automatic Human Model Generation", 2005, pp. 41-48, University of Auckland (CITR), New Zealand.

Shao et al., "An Open System Architecture for a Multimedia and Multimodal User Interface", Aug. 24, 1998, Japanese Society for Rehabilitation of Persons with Disabilities (JSRPD), Japan.

Sheridan et al., "Virtual Reality Check", Technology Review, Oct. 1993, pp. 22-28, vol. 96, No. 7.

Shivappa et al., "Person Tracking with Audio-Visual Cues Using Iterative Decoding Framework", IEEE Fifth International Conference on Advanced Video and Signal Based Surveillance, AVSS '08, Santa Fe, NM, Sep. 1-3, 2008, 260-267.

Stevens, "Flights into Virtual Reality Treating Real World Disorders", The Washington Post, Mar. 27, 1995, Science Psychology, 2 pages.

Utsumi et al., "Multi-Camera Hand Pose Recognition System Using Skeleton Image", ATR Media Integration & Communications Research Laboratories, IEEE International Workshop on Robot and Human Communication, (no month available), 1995, 219-224.

Wilson et al., "Realtime Online Adaptive Gesture Recognition", Proceedings of International Workshop on Recognition, Analysis, and Tracking of Faces and Gestures in Real-Time Systems, (no month available), 1999, 6 pages.

Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.

Zhao, "Dressed Human Modeling, Detection, and Parts Localization", 2001, The Robotics Institute, Carnegie Mellon University, Pittsburgh, PA.

\* cited by examiner

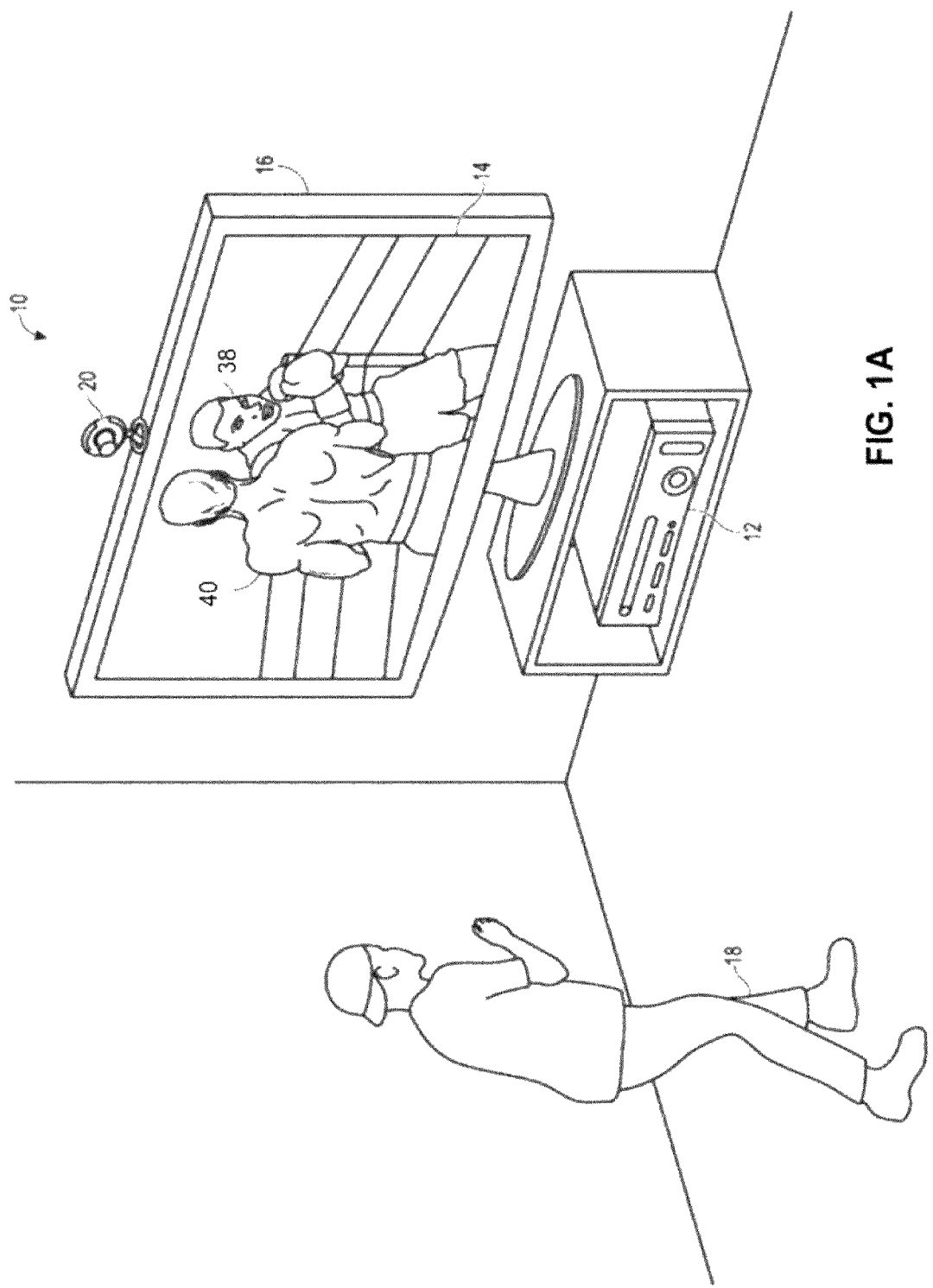

DETERMINE INTENDED MOTIONS

CROSS REFERENCE TO RELATED APPLICATIONS

This application is a continuation of U.S. patent application Ser. No. 12/434,532 filed on May 1, 2009, the entire contents are incorporated herein by reference.

BACKGROUND

Many computing applications such as computer games, multimedia applications, office applications or the like use controls to allow users to manipulate game characters or other aspects of an application. Typically such controls are input using, for example, controllers, remotes, keyboards, mice, or the like. Unfortunately, such controls can be difficult to learn, thus creating a barrier between a user and such games and applications. Furthermore, such controls may be different than actual game actions or other application actions for which the controls are used. For example, a game control that causes a game character to swing a baseball bat may not correspond to an actual motion of swinging the baseball bat.

SUMMARY

A monitor may display a visual representation that maps to a target in a physical space, where image data corresponding to the target has been captured by the system. For example, the visual representation may be an avatar displayed on a screen, where that avatar's motion is controlled by mapping a user's motion in the physical space to the avatar's motion in the virtual space. It may be desirable to modify aspects of captured motion prior to the display of the visual representation. For example, the system may scan or otherwise receive image data of a target in the physical space and generate a model of the target from the image data. The visual representation of the target may be based on the generated model. Where the target is a human, the system may generate a skeletal model or mesh model, for example, from the image data. Prior to providing a visual representation of the model, aspects of the model may be modified. For example, certain joints of a skeletal model may be readjusted or realigned. A model of the target may be modified via any suitable technique, including applying differential correction, magnetism principles, binary snapping, confining virtual movement to defined spaces, or the like.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The systems, methods, and computer readable media for a gesture recognizer system architecture in accordance with this specification are further described with reference to the accompanying drawings in which:

FIGS. 1A and 1B illustrate an example embodiment of a target recognition, analysis, and tracking system with a user playing a game.

DETAILED DESCRIPTION OF ILLUSTRATIVE EMBODIMENTS

Figure 1B:
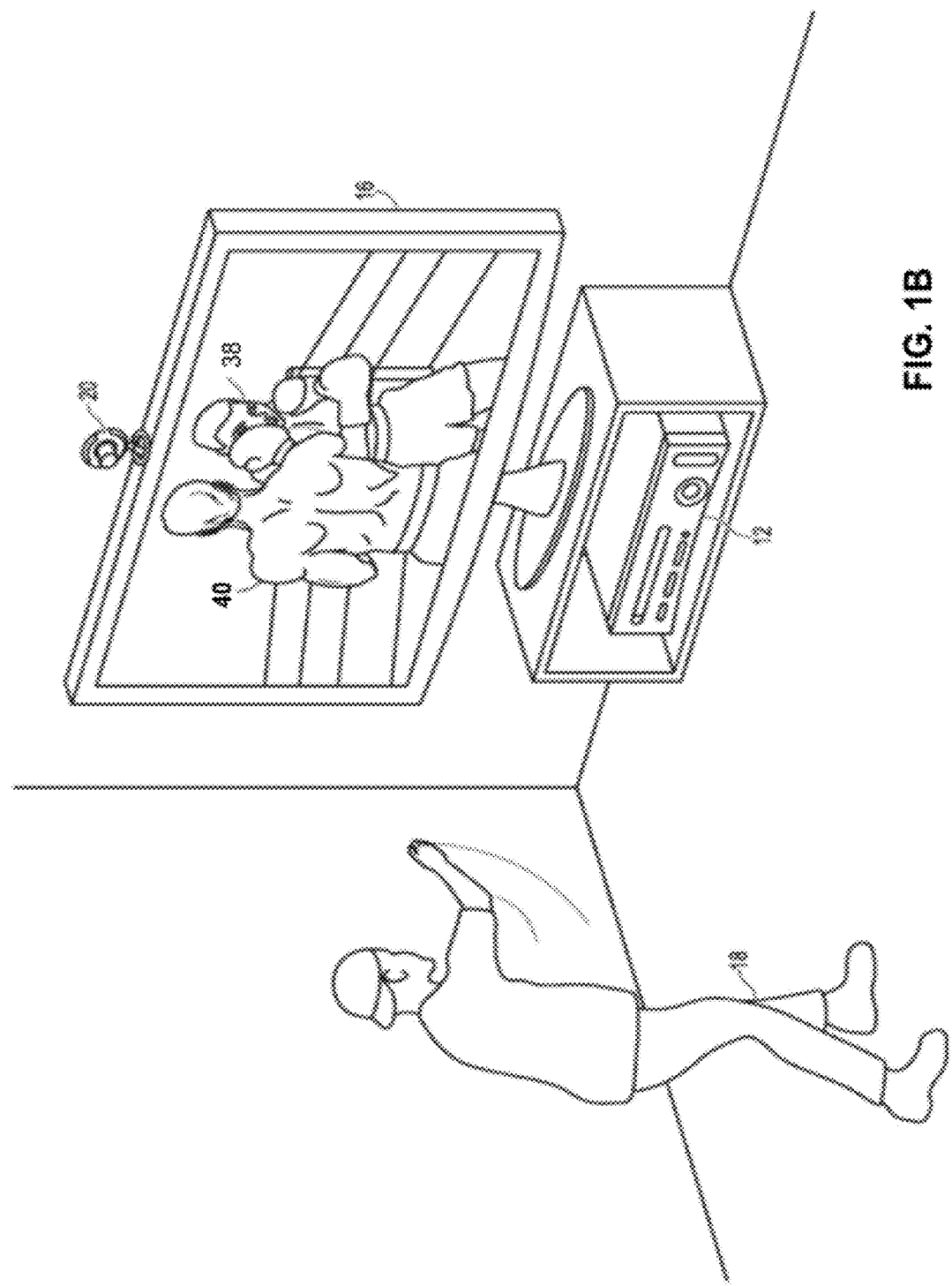

A computing system can model and display a visual representation of a target in a physical space. A camera-controlled computer system may capture target image data, generate a model of the target, and display feedback of the model that maps to the target or motion captured in the physical space. For example, the target may be a human user that is motioning or gesturing in the physical space. The visual representation of the target may be an avatar displayed on a screen, and the avatar's motion may correspond to the user's motion by mapping the avatar's movement to that of the user. The animation of the captured motion or the user-performed gesture can be driven by the capture device input. As will be described herein, it may be desirable to apply corrective data to aspects of captured motion or the user-performed gesture for displaying a visual representation that corresponds to the corrective data.

To generate a model representative of a target or object in a physical space, a capture device can capture a depth image of the scene and scan targets or objects in the scene. In one embodiment, the capture device may determine whether one or more targets or objects in the scene corresponds to a human target such as the user. To determine whether a target or object in the scene corresponds a human target, each of the targets may be flood filled and compared to a pattern of a human body model. Each target or object that matches the human body model may then be scanned to generate a model associated therewith. For example, a target identified as a human may be scanned to generate a skeletal model associated therewith. The skeletal model may be provided to the computing environment for tracking the skeletal model and rendering an avatar associated with the skeletal model. The computing environment may determine which controls to perform in an application executing on the computer environment based on, for example, gestures of the user that have been recognized and mapped to the skeletal model. Thus, user feedback may be displayed, such as via an avatar on a screen, and the user can control that avatar's motion by making gestures in the physical space.

As will be described herein, it may be desirable to modify aspects of the image data that represents motion in the physical space, prior to providing a visual representation that corresponds to the image data. For example, it may be desirable to modify aspects of captured motion for animation purposes. The image data may include data representative of any motion in the physical space that is captured by the capture device, such as a camera. The captured motion could include the motion of a target, such as a human or an object, in the physical space. The image data may include data representative of a gesture that translates to a control in an operating system or application. The motion or the gesture may be dynamic, such as a running motion, or the motion may be static, such as a user that is posed with little movement.

Aspects of a skeletal or mesh model of a person, generated based on the image data captured by the capture device, may be modified prior to animation. The modification may be made to the model generated from image data that represents a target or a target's motion in the physical space. For example, certain joints of a skeletal model may be readjusted or realigned. The model of a target may be modified by applying differential correction, magnetism principles, binary snapping, confining virtual movement to defined spaces, or the like. For example, magnetism principles may include the concept of smoothing captured motion towards a virtual magnet. Error bands may be defined around an expected gesture, where the captured motion that falls within those error bands may be funneled to a desired position or gesture, for example. The disclosed techniques provide the realism of motion capture for full-body locomotion, but at the same time allow the animator (e.g., runtime logic) to constrain and retarget parts of the body animation to be physically accurate (e.g. the arm or leg) or to simply provide a more pleasing display.

The system, methods, and components described herein may be embodied in a multi-media console, such as a gaming console, or in any other computing device of system in which it is desired to modify image data, including, by way of example and without any intended limitation, satellite receivers, set top boxes, arcade games, personal computers (PCs), portable telephones, personal digital assistants (PDAs), and other hand-held devices.

FIGS. 1A and 1B illustrate an example embodiment of a configuration of a target recognition, analysis, and tracking system 10 that may employ techniques for modifying aspects of image data that may, in turn, modify the visual representation that corresponds to the image data. In the example embodiment, a user 18 is playing a boxing game. In an example embodiment, the system 10 may recognize, analyze, and/or track a human target such as the user 18. The system 10 may gather information related to the user's 18 gestures in the physical space.

As shown in FIG. 1A, the target recognition, analysis, and tracking system 10 may include a computing environment 12. The computing environment 12 may be a computer, a gaming system or console, or the like. According to an example embodiment, the computing environment 12 may include hardware components and/or software components such that the computing environment 12 may be used to execute applications such as gaming applications, non-gaming applications, or the like.

As shown in FIG. 1A, the target recognition, analysis, and tracking system 10 may further include a capture device 20.

The capture device 20 may be, for example, a camera that may be used to visually monitor one or more users, such as the user 18, such that gestures performed by the one or more users may be captured, analyzed, and tracked to perform one or more controls or actions within an application, as will be described in more detail below.

According to one embodiment, the target recognition, analysis, and tracking system 10 may be connected to an audiovisual device 16 such as a television, a monitor, a high-definition television (HDTV), or the like that may provide game or application visuals and/or audio to a user such as the user 18. For example, the computing environment 12 may include a video adapter such as a graphics card and/or an audio adapter such as a sound card that may provide audiovisual signals associated with the game application, non-game application, or the like. The audiovisual device 16 may receive the audiovisual signals from the computing environment 12 and may then output the game or application visuals and/or audio associated with the audiovisual signals to the user 18. According to one embodiment, the audiovisual device 16 may be connected to the computing environment 12 via, for example, an S-Video cable, a coaxial cable, an HDMI cable, a DVI cable, a VGA cable, or the like.

As shown in FIGS. 1A and 1B, the target recognition, analysis, and tracking system 10 may be used to recognize, analyze, and/or track a human target such as the user 18. For example, the user 18 may be tracked using the capture device 20 such that the movements of user 18 may be interpreted as controls that may be used to affect the application being executed by computer environment 12. Thus, according to one embodiment, the user 18 may move his or her body to control the application.

The system 10 may translate an input to the capture device 20 into an animation, the input being representative of a user's 18 motion, such that the animation is driven by that input. Thus, the user's 18 motions may map to an avatar such that the user's 18 motions in the physical space are performed by the avatar. The user's 18 motions may be gestures that are applicable to a control in an application. As shown in FIGS. 1A and 1B, in an example embodiment, the application executing on the computing environment 12 may be a boxing game that the user 18 may be playing. For example, the computing environment 12 may use the audiovisual device 16 to provide a visual representation of a boxing opponent 38 to the user 18. The computing environment 12 may also use the audiovisual device 16 to provide a visual representation of a player avatar 24 that the user 18 may control with his or her movements. For example, as shown in FIG. 1B, the user 18 may throw a punch in physical space to cause the player avatar 40 to throw a punch in game space. Thus, according to an example embodiment, the computer environment 12 and the capture device 20 of the target recognition, analysis, and tracking system 10 may be used to recognize and analyze the punch of the user 18 in physical space such that the punch may be interpreted as a game control of the player avatar 40 in game space.

Other movements by the user 18 may also be interpreted as other controls or actions, such as controls to bob, weave, shuffle, block, jab, or throw a variety of different power punches. Furthermore, some movements may be interpreted as controls that may correspond to actions other than controlling the player avatar 40. For example, the player may use movements to end, pause, or save a game, select a level, view high scores, communicate with a friend, etc. Additionally, a full range of motion of the user 18 may be available, used, and analyzed in any suitable manner to interact with an application.

It may be desirable to modify aspects of the captured motion prior to display. For example, a user may be off balance in the physical space. If the user's 18 motions are mapped to a visual representation, such as an avatar, it may be desirable to modify the avatar to be balanced but still represent the user's 18 motions in the physical space. The system 10 may employ techniques for modifying aspects of a user's 18 captured motion for display purposes. For example, at certain points throughout the user's 18 boxing motion shown in FIGS. 1A and 1B, rather than track, analyze, and map to a display an animation that maps directly to the user's 18 actual motion or gestures, it may be desirable to modify at least a portion of the image data that represents the user 18 or the captured motion for mapping to the visual representation. The modification may be made to the image data or a model generated from the image data.

In example embodiments, the human target such as the user 18 may have an object. In such embodiments, the user 18 of an electronic game may be holding the object such that the motions of the player and the object may be used to adjust and/or control parameters of the game. For example, the motion of a player holding a racket may be tracked and utilized for controlling an on-screen racket in an electronic sports game. In another example embodiment, the motion of a player holding an object may be tracked and utilized for controlling an on-screen weapon in an electronic combat game. Modifying aspects of captured motion for animation purposes may include modifying aspects of captured motion as it relates to objects in the scene.

A user's 18 gestures or motion may be interpreted as a control that may correspond to actions other than controlling the player avatar 40. For example, the player may use movements to end, pause, or save a game, select a level, view high scores, communicate with a friend, etc. According to other example embodiments, the target recognition, analysis, and tracking system 10 may interpret target movements for controlling aspects of an operating system and/or application that are outside the realm of games. For example, virtually any controllable aspect of an operating system and/or application may be controlled by movements of the target such as the user 18.

The user's 18 gesture may be controls applicable to an operating system, non-gaming aspects of a game, or a non-gaming application. The user's 18 gestures may be interpreted as object manipulation, such as controlling a user interface. For example, consider a user interface having blades or a tabbed interface lined up vertically left to right, where the selection of each blade or tab opens up the options for various controls within the application or the system. The system 10 may identify the user's 18 hand gesture for movement of a tab, where the user's 18 hand in the physical space is virtually aligned with a tab in the application space. The gesture, including a pause, a grabbing motion, and then a sweep of the hand to the left, may be interpreted as the selection of a tab, and then moving it out of the way to open the next tab.

Figure 2:
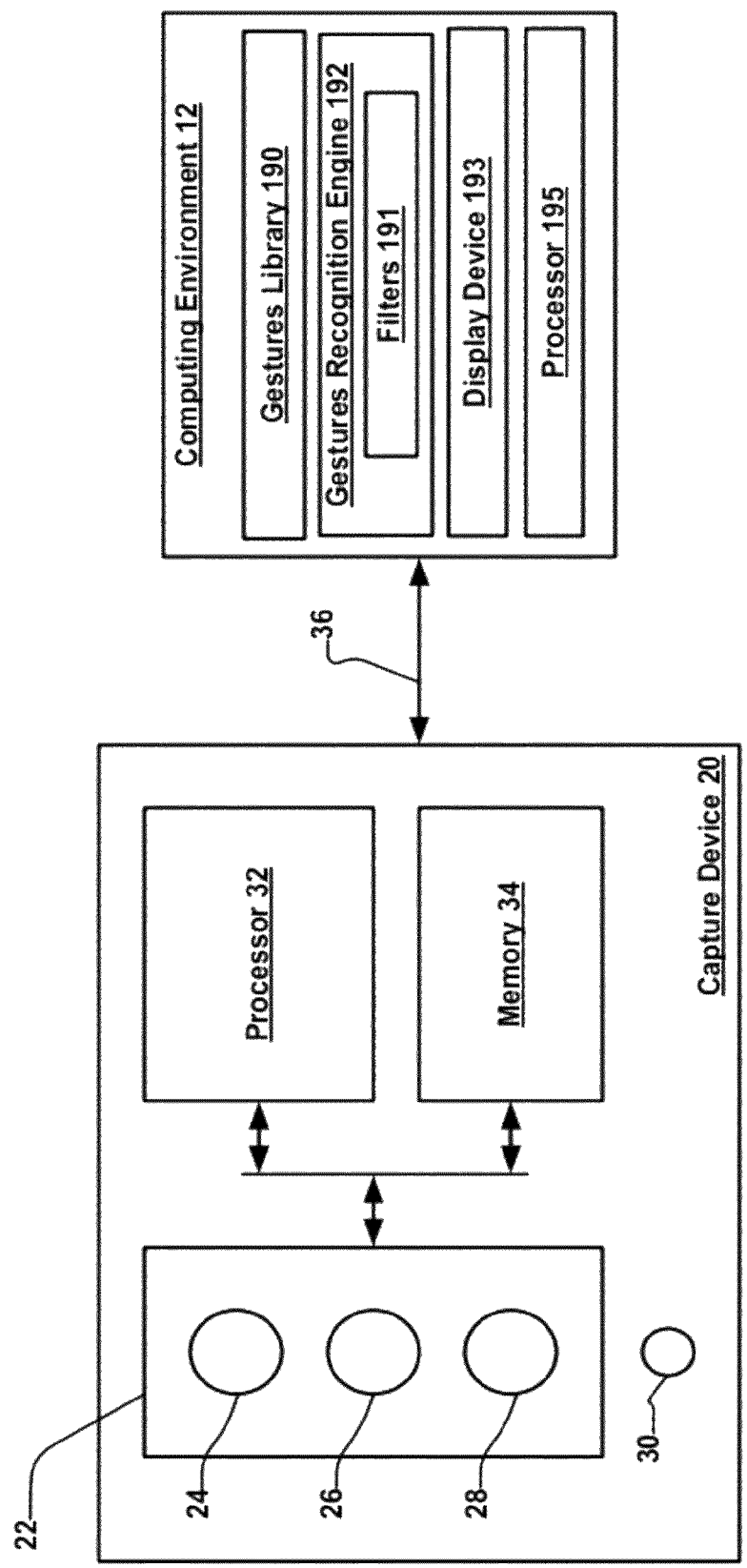
FIG. 2 illustrates an example embodiment of a capture device that may be used in a target recognition, analysis, and tracking system and incorporate chaining and animation blending techniques.

FIG. 2 illustrates an example embodiment of a capture device 20 that may be used for target recognition, analysis, and tracking, where the target can be a user or an object. According to an example embodiment, the capture device 20 may be configured to capture video with depth information including a depth image that may include depth values via any suitable technique including, for example, time-of-flight, structured light, stereo image, or the like. According to one embodiment, the capture device 20 may organize the calculated depth information into "Z layers," or layers that may be perpendicular to a Z axis extending from the depth camera along its line of sight.

As shown in FIG. 2, the capture device 20 may include an image camera component 22. According to an example embodiment, the image camera component 22 may be a depth camera that may capture the depth image of a scene. The depth image may include a two-dimensional (2-D) pixel area of the captured scene where each pixel in the 2-D pixel area may represent a depth value such as a length or distance in, for example, centimeters, millimeters, or the like of an object in the captured scene from the camera.

As shown in FIG. 2, according to an example embodiment, the image camera component 22 may include an IR light component 24, a three-dimensional (3-D) camera 26, and an RGB camera 28 that may be used to capture the depth image of a scene. For example, in time-of-flight analysis, the IR light component 24 of the capture device 20 may emit an infrared light onto the scene and may then use sensors (not shown) to detect the backscattered light from the surface of one or more targets and objects in the scene using, for example, the 3-D camera 26 and/or the RGB camera 28. In some embodiments, pulsed infrared light may be used such that the time between an outgoing light pulse and a corresponding incoming light pulse may be measured and used to determine a physical distance from the capture device 20 to a particular location on the targets or objects in the scene. Additionally, in other example embodiments, the phase of the outgoing light wave may be compared to the phase of the incoming light wave to determine a phase shift. The phase shift may then be used to determine a physical distance from the capture device to a particular location on the targets or objects.

According to another example embodiment, time-of-flight analysis may be used to indirectly determine a physical distance from the capture device 20 to a particular location on the targets or objects by analyzing the intensity of the reflected beam of light over time via various techniques including, for example, shuttered light pulse imaging.

In another example embodiment, the capture device 20 may use a structured light to capture depth information. In such an analysis, patterned light (i.e., light displayed as a known pattern such as grid pattern or a stripe pattern) may be projected onto the scene via, for example, the IR light component 24. Upon striking the surface of one or more targets or objects in the scene, the pattern may become deformed in response. Such a deformation of the pattern may be captured by, for example, the 3-D camera 26 and/or the RGB camera 28 and may then be analyzed to determine a physical distance from the capture device to a particular location on the targets or objects.

According to another embodiment, the capture device 20 may include two or more physically separated cameras that may view a scene from different angles, to obtain visual stereo data that may be resolved to generate depth information. The capture device 20 may further include a microphone 30, or an array of microphones. The microphone 30 may include a transducer or sensor that may receive and convert sound into an electrical signal. According to one embodiment, the microphone 30 may be used to reduce feedback between the capture device 20 and the computing environment 12 in the target recognition, analysis, and tracking system 10. Additionally, the microphone 30 may be used to receive audio signals that may also be provided by the user to control applications such as game applications, non-game applications, or the like that may be executed by the computing environment 12.

In an example embodiment, the capture device 20 may further include a processor 32 that may be in operative communication with the image camera component 22. The processor 32 may include a standardized processor, a specialized processor, a microprocessor, or the like that may execute instructions that may include instructions for receiving the depth image, determining whether a suitable target may be included in the depth image, converting the suitable target into a skeletal representation or model of the target, or any other suitable instruction.

The capture device 20 may further include a memory component 34 that may store the instructions that may be executed by the processor 32, images or frames of images captured by the 3-D camera or RGB camera, or any other suitable information, images, or the like. According to an example embodiment, the memory component 34 may include random access memory (RAM), read only memory (ROM), cache, Flash memory, a hard disk, or any other suitable storage component. As shown in FIG. 2, in one embodiment, the memory component 34 may be a separate component in communication with the image capture component 22 and the processor 32. According to another embodiment, the memory component 34 may be integrated into the processor 32 and/or the image capture component 22.

As shown in FIG. 2, the capture device 20 may be in communication with the computing environment 12 via a communication link 36. The communication link 36 may be a wired connection including, for example, a USB connection, a Firewire connection, an Ethernet cable connection, or the like and/or a wireless connection such as a wireless 802.11b, g, a, or n connection. According to one embodiment, the computing environment 12 may provide a clock to the capture device 20 that may be used to determine when to capture, for example, a scene via the communication link 36.

Additionally, the capture device 20 may provide the depth information and images captured by, for example, the 3-D camera 26 and/or the RGB camera 28, and a skeletal model that may be generated by the capture device 20 to the computing environment 12 via the communication link 36. The computing environment 12 may then use the skeletal model, depth information, and captured images to, for example, control an application such as a game or word processor.

As shown, in FIG. 2, the computing environment 12 may include a gestures library 190 and a gestures recognition engine 192. The gestures recognition engine 192 may include a collection of gesture filters 191. Each filter 191 may comprise information defining a gesture along with parameters, or metadata, for that gesture. For instance, a throw, which comprises motion of one of the hands from behind the rear of the body to past the front of the body, may be implemented as a gesture filter comprising information representing the movement of one of the hands of the user from behind the rear of the body to past the front of the body, as that movement would be captured by a depth camera. Parameters may then be set for that gesture. Where the gesture is a throw, a parameter may be a threshold velocity that the hand has to reach, a distance the hand must travel (either absolute, or relative to the size of the user as a whole), and a confidence rating by the recognizer engine that the gesture occurred. These parameters for the gesture may vary between applications, between contexts of a single application, or within one context of one application over time.

The data captured by the cameras 26, 28 and device 20 in the form of the skeletal model and movements associated with it may be compared to the gesture filters 191 in the gesture library 190 to identify when a user (as represented by the skeletal model) has performed one or more gestures.

Thus, inputs to a filter such as filter 191 may comprise things such as joint data about a user's joint position, like angles formed by the bones that meet at the joint, RGB color data from the scene, and the rate of change of an aspect of the user. As mentioned, parameters may be set for the gesture. Outputs from a filter 191 may comprise things such as the confidence that a given gesture is being made, the speed at which a gesture motion is made, and a time at which the gesture occurs.

The computing environment 12 may include a processor 195 that can process the depth image to determine what targets are in a scene, such as a user 18 or an object in the room. This can be done, for instance, by grouping together of pixels of the depth image that share a similar distance value. The image may also be parsed to produce a skeletal representation of the user, where features, such as joints and tissues that run between joints is identified. There exist skeletal mapping techniques to capture a person with a depth camera and from that determine various spots on that user's skeleton, joints of the hand, wrists, elbows, knees, nose, ankles, shoulders, and where the pelvis meets the spine. Other techniques include transforming the image into a body model representation of the person and transforming the image into a mesh model representation of the person.

In an embodiment, the processing is performed on the capture device 20 itself, and the raw image data of depth and color (where the capture device comprises a 3D camera) values are transmitted to the computing environment 12 via link 36. In another embodiment, the processing is performed by a processor 32 coupled to the camera 20 and then the parsed image data is sent to the computing environment 12. In still another embodiment, both the raw image data and the parsed image data are sent to the computing environment 12. The computing environment 12 may receive the parsed image data but it may still receive the raw data for executing the current process or application. For instance, if an image of the scene is transmitted across a computer network to another user, the computing environment 12 may transmit the raw data for processing by another computing environment.

The computing environment 12 may use the gestures library 190 to interpret movements of the skeletal model and to control an application based on the movements. The computing environment 12 can model and display a representation of a user, such as in the form of an avatar or a pointer on a display, such as in a display device 193. Display device 193 may include a computer monitor, a television screen, or any suitable display device. For example, a camera-controlled computer system may capture user image data and display user feedback on a television screen that maps to the user's gestures. The user feedback may be displayed as an avatar on the screen such as shown in FIGS. 1A and 1B. The avatar's motion can be controlled directly by mapping the avatar's movement to those of the user's movements. The user's gestures may control certain aspects of the application.

It may be desirable to modify aspects of captured motion for animation purposes. For example, aspects of a skeletal or mesh model of a person, generated based on the image data captured by the capture device, may be modified prior to animation. The modification may be made to the model generated from image data that represents a target in the physical space. For example, certain joints of the skeletal model may be readjusted or realigned. A model of a target may be modified by applying differential correction, magnetism principles, or confining virtual movement to defined spaces. Each of these example embodiment are described in more detail below.

The gestures library 190 or gestures recognition engine 192 may be implemented in hardware, software or a combination of both. For example, the gestures library 190 and gestures recognition engine 192 may be implemented as software that executes on a processor, such as processor 196, of the computing environment (or on processing unit 101 of FIG. 3 or processing unit 259 of FIG. 4).

Figure 3:
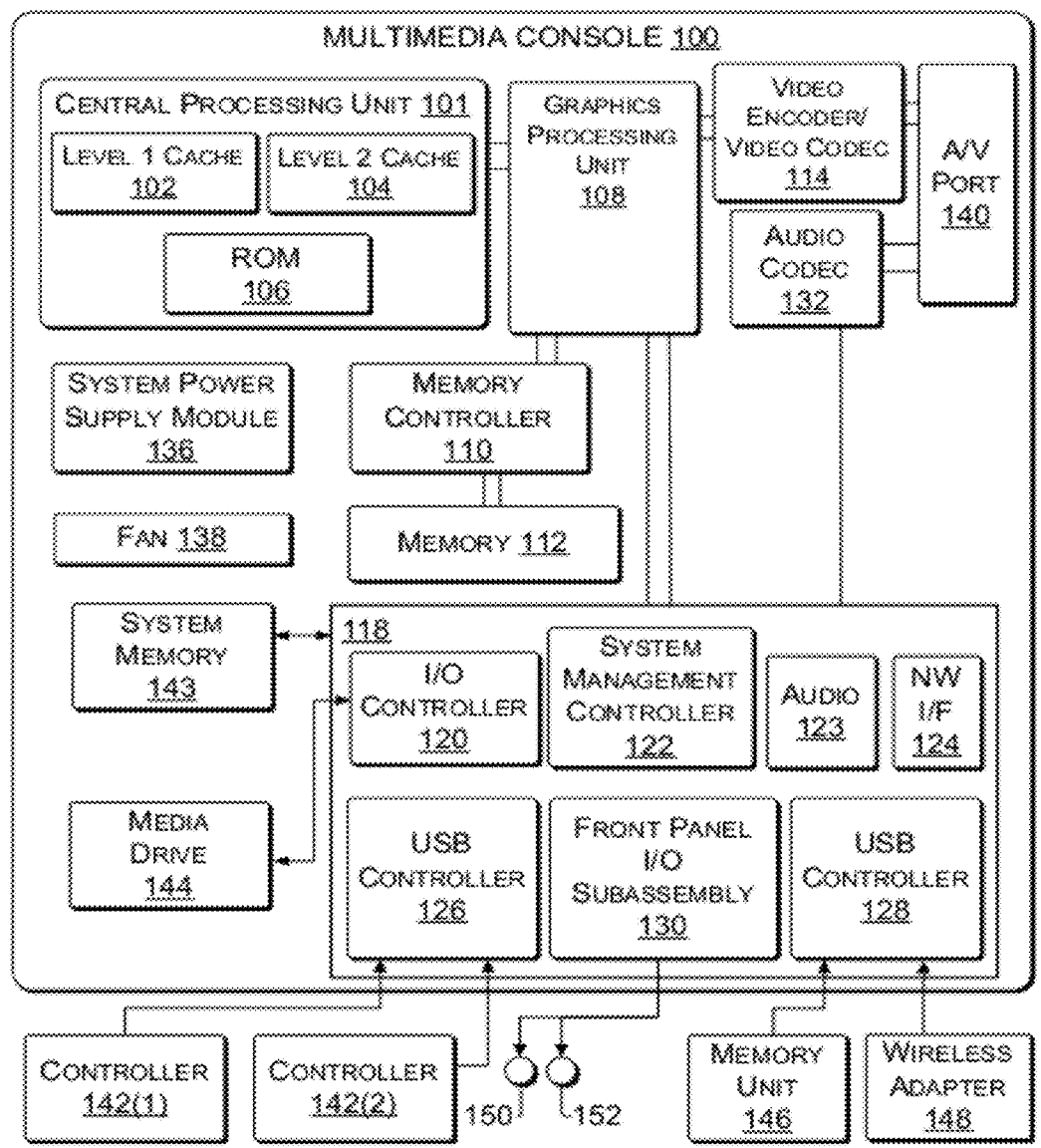
FIG. 3 illustrates an example embodiment of a computing environment in which the animation techniques described herein may be embodied.
Figure 4:
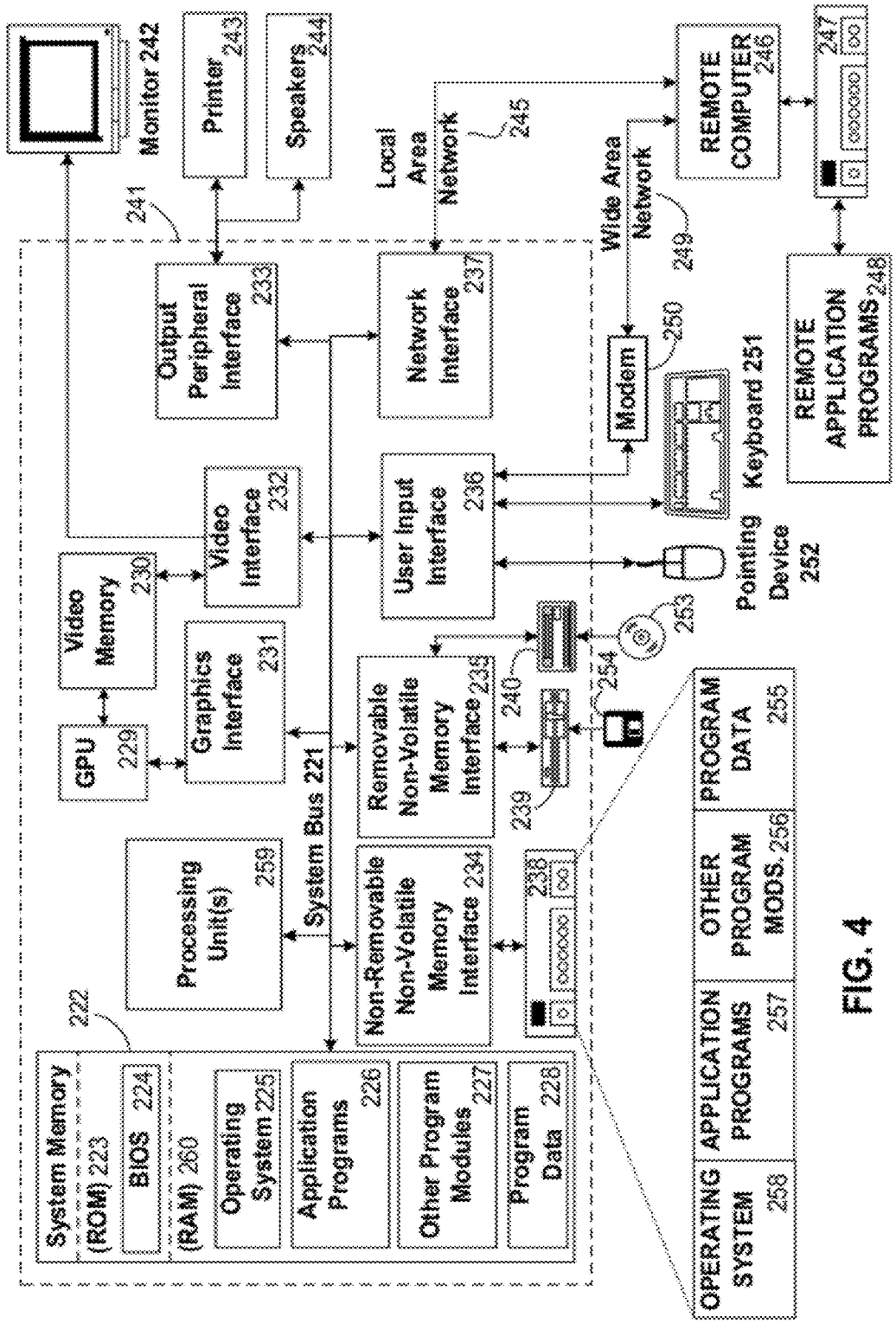
FIG. 4 illustrates another example embodiment of a computing environment in which the animation techniques described herein may be embodied.

It is emphasized that the block diagram depicted in FIGS. 2-4 are exemplary and not intended to imply a specific implementation. Thus, the processor 195 or 32 in FIG. 1, the processing unit 101 of FIG. 3, and the processing unit 259 of FIG. 4, can be implemented as a single processor or multiple processors. Multiple processors can be distributed or centrally located. For example, the gestures library 190 may be implemented as software that executes on the processor 32 of the capture device or it may be implemented as software that executes on the processor 195 in the computing environment. Any combination of processors that are suitable for performing the techniques disclosed herein are contemplated. Multiple processors can communicate wirelessly, via hard wire, or a combination thereof.

Furthermore, as used herein, a computing environment may refer to a single computing device or to a computing system. The computing environment may include non-computing components. The computing environment may include a display device, such as display device 193 shown in FIG. 2. A display device may be an entity separate but coupled to the computing environment or the display device may be the computing device that processes and displays, for example. Thus, a computing system, computing device, computing environment, computer, processor, or other computing component may be used interchangeably herein.

Gestures may be grouped together into genre packages of complimentary gestures that are likely to be used by an application in that genre. Complimentary gestures—either complimentary as in those that are commonly used together, or complimentary as in a change in a parameter of one will change a parameter of another—may be grouped together into genre packages. These packages may be provided to an application, which may select at least one. The application may tune, or modify, the parameter of a gesture or gesture filter to best fit the unique aspects of the application. When that parameter is tuned, a second, complimentary parameter (in the inter-dependent sense) of either the gesture or a second gesture is also tuned such that the parameters remain complimentary. Genre packages for video games may include genres such as first-user shooter, action, driving, and sports.

FIG. 3 illustrates an example embodiment of a computing environment that may be used to interpret one or more gestures in a target recognition, analysis, and tracking system. The computing environment such as the computing environment 12 described above with respect to FIGS. 1A-2 may be a multimedia console 100, such as a gaming console. As shown in FIG. 3, the multimedia console 100 has a central processing unit (CPU) 101 having a level 1 cache 102, a level 2 cache 104, and a flash ROM (Read Only Memory) 106. The level 1 cache 102 and a level 2 cache 104 temporarily store data and hence reduce the number of memory access cycles, thereby improving processing speed and throughput. The CPU 101 may be provided having more than one core, and thus, additional level 1 and level 2 caches 102 and 104. The flash ROM 106 may store executable code that is loaded during an initial phase of a boot process when the multimedia console 100 is powered ON.

A graphics processing unit (GPU) 108 and a video encoder/video codec (coder/decoder) 114 form a video processing pipeline for high speed and high resolution graphics processing. Data is carried from the graphics processing unit 108 to the video encoder/video codec 114 via a bus. The video processing pipeline outputs data to an A/V (audio/video) port 140 for transmission to a television or other display. A memory controller 110 is connected to the GPU 108 to facilitate processor access to various types of memory 112, such as, but not limited to, a RAM (Random Access Memory).

The multimedia console 100 includes an I/O controller 120, a system management controller 122, an audio processing unit 123, a network interface controller 124, a first USB host controller 126, a second USB controller 128 and a front panel I/O subassembly 130 that are preferably implemented on a module 118. The USB controllers 126 and 128 serve as hosts for peripheral controllers 142(1)-142(2), a wireless adapter 148, and an external memory device 146 (e.g., flash memory, external CD/DVD ROM drive, removable media, etc.). The network interface 124 and/or wireless adapter 148 provide access to a network (e.g., the Internet, home network, etc.) and may be any of a wide variety of various wired or wireless adapter components including an Ethernet card, a modem, a Bluetooth module, a cable modem, and the like.

System memory 143 is provided to store application data that is loaded during the boot process. A media drive 144 is provided and may comprise a DVD/CD drive, hard drive, or other removable media drive, etc. The media drive 144 may be internal or external to the multimedia console 100. Application data may be accessed via the media drive 144 for execution, playback, etc. by the multimedia console 100. The media drive 144 is connected to the I/O controller 120 via a bus, such as a Serial ATA bus or other high speed connection (e.g., IEEE 1394).

The system management controller 122 provides a variety of service functions related to assuring availability of the multimedia console 100. The audio processing unit 123 and an audio codec 132 form a corresponding audio processing pipeline with high fidelity and stereo processing. Audio data is carried between the audio processing unit 123 and the audio codec 132 via a communication link. The audio processing pipeline outputs data to the A/V port 140 for reproduction by an external audio player or device having audio capabilities.

The front panel I/O subassembly 130 supports the functionality of the power button 150 and the eject button 152, as well as any LEDs (light emitting diodes) or other indicators exposed on the outer surface of the multimedia console 100. A system power supply module 136 provides power to the components of the multimedia console 100. A fan 138 cools the circuitry within the multimedia console 100.

The CPU 101, GPU 108, memory controller 110, and various other components within the multimedia console 100 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 100 is powered ON, application data may be loaded from the system memory 143 into memory 112 and/or caches 102, 104 and executed on the CPU 101. The application may present a graphical user interface that provides a consistent user experience when navigating to different media types available on the multimedia console 100. In operation, applications and/or other media contained within the media drive 144 may be launched or played from the media drive 144 to provide additional functionalities to the multimedia console 100.

The multimedia console 100 may be operated as a standalone system by simply connecting the system to a television or other display. In this standalone mode, the multimedia console 100 allows one or more users to interact with the system, watch movies, or listen to music. However, with the integration of broadband connectivity made available through the network interface 124 or the wireless adapter 148, the multimedia console 100 may further be operated as a participant in a larger network community.

When the multimedia console 100 is powered ON, a set amount of hardware resources are reserved for system use by the multimedia console operating system. These resources may include a reservation of memory (e.g., 16 MB), CPU and GPU cycles (e.g., 5%), networking bandwidth (e.g., 8 kbs.), etc. Because these resources are reserved at system boot time, the reserved resources do not exist from the application's view.

In particular, the memory reservation preferably is large enough to contain the launch kernel, concurrent system applications and drivers. The CPU reservation is preferably constant such that if the reserved CPU usage is not used by the system applications, an idle thread will consume any unused cycles.

With regard to the GPU reservation, lightweight messages generated by the system applications (e.g., pop-ups) are displayed by using a GPU interrupt to schedule code to render popup into an overlay. The amount of memory required for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV resynch is eliminated.

After the multimedia console 100 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 101 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 142(1) and 142(2)) are shared by gaming applications and system applications. The input devices are not reserved resources, but are to be switched between system applications and the gaming application such that each will have a focus of the device. The application manager preferably controls the switching of input stream, without knowledge the gaming application's knowledge and a driver maintains state information regarding focus switches. The cameras 26, 28 and capture device 20 may define additional input devices for the console 100.

FIG. 4 illustrates another example embodiment of a computing environment 220 that may be the computing environment 12 shown in FIGS. 1A-2 used to interpret one or more gestures in a target recognition, analysis, and tracking system. The computing system 220 is only one example of a suitable computing environment and is not intended to suggest any limitation as to the scope of use or functionality of the presently disclosed subject matter. Neither should the computing environment 220 be interpreted as having any dependency or requirement relating to any one or combination of components illustrated in the exemplary operating environment 220. In some embodiments the various depicted computing elements may include circuitry configured to instantiate specific aspects of the present disclosure. For example, the term circuitry used in the disclosure can include specialized hardware components configured to perform function(s) by firmware or switches. In other examples embodiments the term circuitry can include a general purpose processing unit, memory, etc., configured by software instructions that embody logic operable to perform function(s). In example embodiments where circuitry includes a combination of hardware and software, an implementer may write source code embodying logic and the source code can be compiled into machine readable code that can be processed by the general purpose processing unit. Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

In FIG. 4, the computing environment 220 comprises a computer 241, which typically includes a variety of computer readable media. Computer readable media can be any available media that can be accessed by computer 241 and includes both volatile and nonvolatile media, removable and non-removable media. The system memory 222 includes computer storage media in the form of volatile and/or nonvolatile memory such as read only memory (ROM) 223 and random access memory (RAM) 260. A basic input/output system 224 (BIOS), containing the basic routines that help to transfer information between elements within computer 241, such as during start-up, is typically stored in ROM 223. RAM 260 typically contains data and/or program modules that are immediately accessible to and/or presently being operated on by processing unit 259. By way of example, and not limitation, FIG. 4 illustrates operating system 225, application programs 226, other program modules 227, and program data 228.

The computer 241 may also include other removable/non-removable, volatile/nonvolatile computer storage media. By way of example only, FIG. 4 illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through an non-removable memory interface such as interface 234, and magnetic disk drive 239 and optical disk drive 240 are typically connected to the system bus 221 by a removable memory interface, such as interface 235.

The drives and their associated computer storage media discussed above and illustrated in FIG. 4, provide storage of computer readable instructions, data structures, program modules and other data for the computer 241. In FIG. 4, for example, hard disk drive 238 is illustrated as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computer 241 through input devices such as a keyboard 251 and pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus, but may be connected by other interface and bus structures, such as a parallel port, game port or a universal serial bus (USB). The cameras 26, 28 and capture device 20 may define additional input devices for the console 100. A monitor 242 or other type of display device is also connected to the system bus 221 via an interface, such as a video interface 232. In addition to the monitor, computers may also include other peripheral output devices such as speakers 244 and printer 243, which may be connected through a output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been illustrated in FIG. 4. The logical connections depicted in FIG. 2 include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. By way of example, and not limitation, FIG. 4 illustrates remote application programs 248 as residing on memory device 247. It will be appreciated that the network connections shown are exemplary and other means of establishing a communications link between the computers may be used.

Figure 5A:
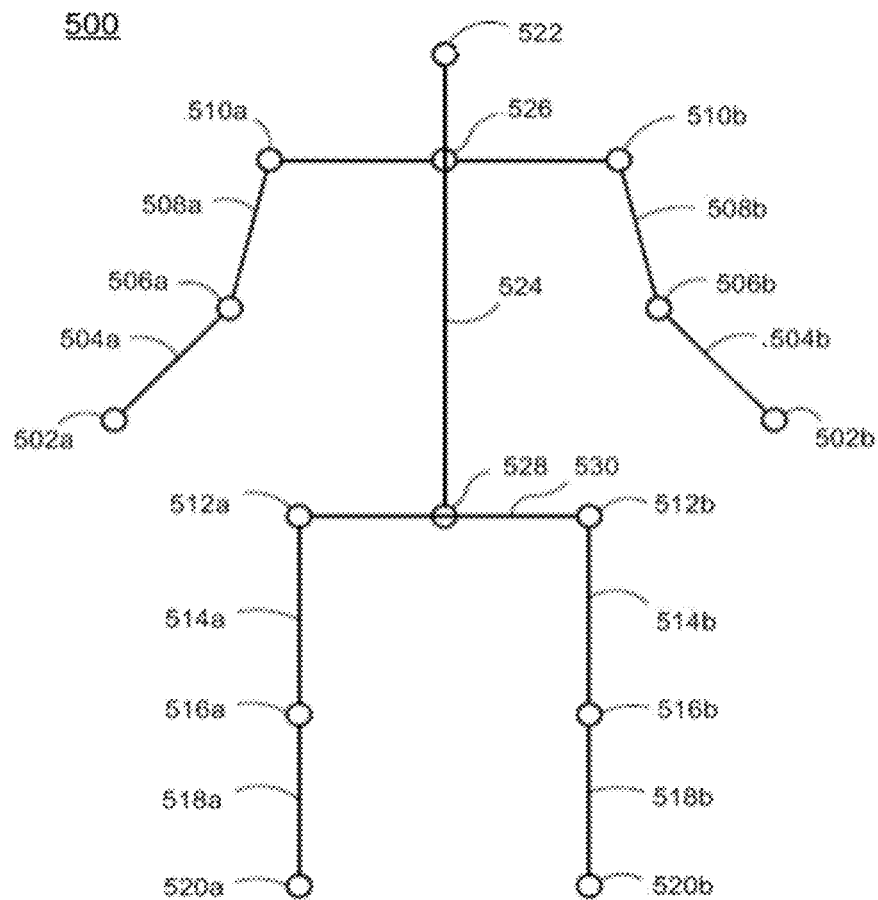
FIG. 5A illustrates a skeletal mapping of a user that has been generated from a depth image.

FIG. 5A depicts an example skeletal mapping of a user that may be generated from image data captured by the capture device 20. In this embodiment, a variety of joints and bones are identified: each hand 502, each forearm 504, each elbow 506, each bicep 508, each shoulder 510, each hip 512, each thigh 514, each knee 516, each foreleg 518, each foot 520, the head 522, the torso 524, the top 526 and bottom 528 of the spine, and the waist 530. Where more points are tracked, additional features may be identified, such as the bones and joints of the fingers or toes, or individual features of the face, such as the nose and eyes.

In an example embodiment, the human target may be isolated and a bitmask of the human target may be created to scan for one or more body parts. The bitmask may be created by, for example, flood filling the human target such that the human target may be separated from other targets or objects in the scene elements. The bitmask may then be analyzed for one or more body parts to generate a model such as a skeletal model, a mesh human model, or the like of the human target. A bitmask may then be generated with respect to FIGS. 6-9 as a three-dimensional model. For example, the bitmask generated for the human target may include values of the human target along, for example, an X, Y, and Z axis. For example, the skeletal model may have at least one joint, and that joint may correspond to an X, Y, and Z position. Each body part may be characterized as a mathematical vector defining joints and bones of the skeletal model, such as the model 500 from FIG. 5A.

A joint may be adjusted to modify the skeletal model 500 of the human target that corresponds to a desired visual representation of the skeletal mode. According to an example embodiment, the initial scan of the bitmask may render a joint 510b that represents the left shoulder joint. The joint 510b may not accurately represent a typical location of a left shoulder joint of a human or it may not accurately represent a location of the left shoulder joint that will provide a balanced or otherwise desired visual representation of the user. The joint 510b may then be adjusted such that the joint may be repositioned with respect to a 3-dimensional coordinate system, for example, along the X, Y, and Z axes, such that the model more accurately represent the desired location of a left shoulder joint of a human.

According to an example embodiment, upon determining the values of, for example, a body part, a data structure may be created that may include measurement values such as length, width, or the like of the body part associated with the scan of the bitmask of the human target. The data structure may include any modifications to joints or body parts as a result of applying corrective data to the model. According to an example embodiment, the skeletal model 500 may include one or more data structures that may represent, for example, the human target 402 described above As shown in FIG. 5A, the skeletal model 500 may include one or more joints 502-530. According to an example embodiment, each of the joints 502-530 may enable one or more body parts defined there between to move relative to one or more other body parts. For example, a model representing a human target may include a plurality of rigid and/or deformable body parts that may be defined by one or more structural members such as "bones" with the joints 502-530 located at the intersection of adjacent bones. The joints 502-530 may enable various body parts associated with the bones and joints 502-530 to move independently of each other. For example, the bone defined between the joints 502 and 506, shown in FIG. 5A, corresponds to a forearm that may be moved independent of, for example, the bone defined between joints 516 and 518 that corresponds to a calf Through moving his body, a user may create gestures. A gesture comprises a motion or pose by a user that may be captured as image data and parsed for meaning A gesture may be dynamic, comprising a motion, such as mimicking throwing a ball. A gesture may be a static pose, such as holding one's crossed forearms 504 in front of his torso 524. A gesture may also incorporate props, such as by swinging a mock sword. A gesture may comprise more than one body part, such as clapping the hands 502 together, or a subtler motion, such as pursing one's lips.

A user's gestures may be used for input in a general computing context. For instance, various motions of the hands 502 or other body parts may correspond to common system wide tasks such as navigate up or down in a hierarchical list, open a file, close a file, and save a file. For instance, a user may hold his hand with the fingers pointing up and the palm facing the capture device 20. He may then close his fingers towards the palm to make a fist, and this could be a gesture that indicates that the focused window in a window-based user-interface computing environment should be closed. Gestures may also be used in a video-game-specific context, depending on the game. For instance, with a driving game, various motions of the hands 502 and feet 520 may correspond to steering a vehicle in a direction, shifting gears, accelerating, and braking Thus, a gesture may indicate a wide variety of motions that map to a displayed user representation, and in a wide variety of applications, such as video games, text editors, word processing, data management, etc.

A user may generate a gesture that corresponds to walking or running, by walking or running in place himself. For example, the user may alternately lift and drop each leg 512-520 to mimic walking without moving. The system may parse this gesture by analyzing each hip 512 and each thigh 514. A step may be recognized when one hip-thigh angle (as measured relative to a vertical line, wherein a standing leg has a hip-thigh angle of 0°, and a forward horizontally extended leg has a hip-thigh angle of 90°) exceeds a certain threshold relative to the other thigh. A walk or run may be recognized after some number of consecutive steps by alternating legs. The time between the two most recent steps may be thought of as a period. After some number of periods where that threshold angle is not met, the system may determine that the walk or running gesture has ceased.

Given a "walk or run" gesture, an application may set values for parameters associated with this gesture. These parameters may include the above threshold angle, the number of steps required to initiate a walk or run gesture, a number of periods where no step occurs to end the gesture, and a threshold period that determines whether the gesture is a walk or a run. A fast period may correspond to a run, as the user will be moving his legs quickly, and a slower period may correspond to a walk.

A gesture may be associated with a set of default parameters at first that the application may override with its own parameters. In this scenario, an application is not forced to provide parameters, but may instead use a set of default parameters that allow the gesture to be recognized in the absence of application-defined parameters. Information related to the gesture may be stored for purposes of pre-canned animation.

There are a variety of outputs that may be associated with the gesture. There may be a baseline "yes or no" as to whether a gesture is occurring. There also may be a confidence level, which corresponds to the likelihood that the user's tracked movement corresponds to the gesture. This could be a linear scale that ranges over floating point numbers between 0 and 1, inclusive. Wherein an application receiving this gesture information cannot accept false-positives as input, it may use only those recognized gestures that have a high confidence level, such as at least 0.95. Where an application must recognize every instance of the gesture, even at the cost of false-positives, it may use gestures that have at least a much lower confidence level, such as those merely greater than 0.2. The gesture may have an output for the time between the two most recent steps, and where only a first step has been registered, this may be set to a reserved value, such as −1 (since the time between any two steps must be positive). The gesture may also have an output for the highest thigh angle reached during the most recent step.

Another exemplary gesture is a "heel lift jump." In this, a user may create the gesture by raising his heels off the ground, but keeping his toes planted. Alternatively, the user may jump into the air where his feet 520 leave the ground entirely. The system may parse the skeleton for this gesture by analyzing the angle relation of the shoulders 510, hips 512 and knees 516 to see if they are in a position of alignment equal to standing up straight. Then these points and upper 526 and lower 528 spine points may be monitored for any upward acceleration. A sufficient combination of acceleration may trigger a jump gesture. A sufficient combination of acceleration with a particular gesture may satisfy the parameters of a transition point.

Given this "heel lift jump" gesture, an application may set values for parameters associated with this gesture. The parameters may include the above acceleration threshold, which determines how fast some combination of the user's shoulders 510, hips 512 and knees 516 must move upward to trigger the gesture, as well as a maximum angle of alignment between the shoulders 510, hips 512 and knees 516 at which a jump may still be triggered. The outputs may comprise a confidence level, as well as the user's body angle at the time of the jump.

Setting parameters for a gesture based on the particulars of the application that will receive the gesture is important in accurately identifying gestures. Properly identifying gestures and the intent of a user greatly helps in creating a positive user experience.

An application may set values for parameters associated with various transition points to identify the points at which to use pre-canned animations. Transition points may be defined by various parameters, such as the identification of a particular gesture, a velocity, an angle of a target or object, or any combination thereof If a transition point is defined at least in part by the identification of a particular gesture, then properly identifying gestures assists to increase the confidence level that the parameters of a transition point have been met.

Another parameter to a gesture may be a distance moved. Where a user's gestures control the actions of an avatar in a virtual environment, that avatar may be arm's length from a ball. If the user wishes to interact with the ball and grab it, this may require the user to extend his arm 502-510 to full length while making the grab gesture. In this situation, a similar grab gesture where the user only partially extends his arm 502-510 may not achieve the result of interacting with the ball. As described below, corrective data may be applied to the image data representative of the gesture to smooth the virtual animation of the user's arm towards the ball. Thus, even though the user's arm is a full length away or not close enough for interaction with the ball, the corrective data may alter the image data to align the visual representation of the user with the virtual ball.

A gesture or a portion thereof may have as a parameter a volume of space in which it must occur. This volume of space may typically be expressed in relation to the body where a gesture comprises body movement. For instance, a football throwing gesture for a right-handed user may be recognized only in the volume of space no lower than the right shoulder 510*a*, and on the same side of the head 522 as the throwing arm 502*a*-310*a*. It may not be necessary to define all bounds of a volume, such as with this throwing gesture, where an outer bound away from the body is left undefined, and the volume extends out indefinitely, or to the edge of scene that is being monitored.

Figure 5B:
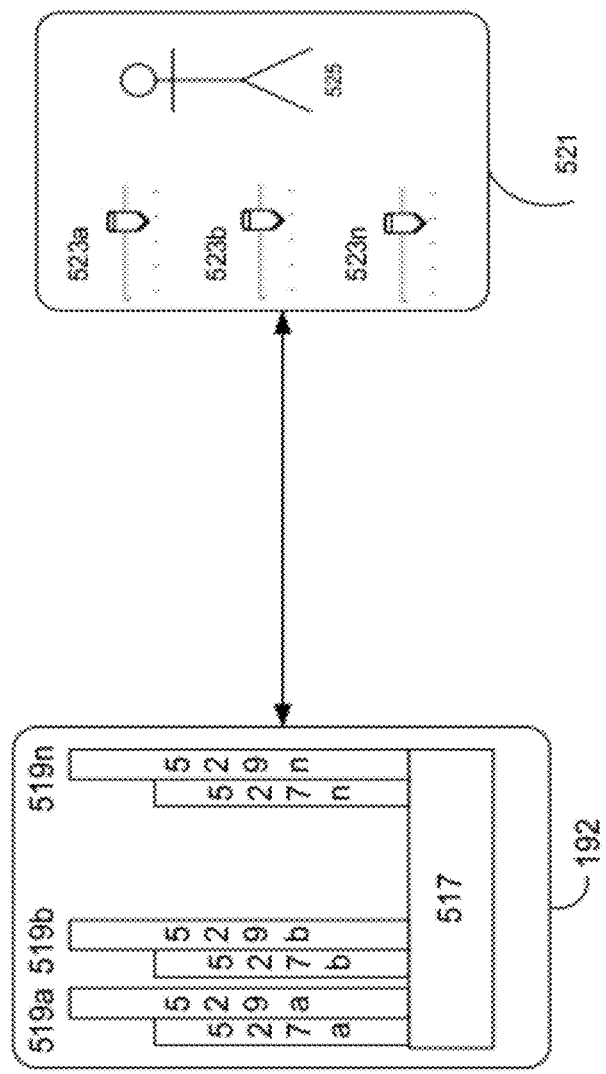
FIG. 5B illustrates further details of the gesture recognizer architecture shown in FIG. 2.

FIG. 5B provides further details of one exemplary embodiment of the gesture recognizer engine 192 of FIG. 2. As shown, the gesture recognizer engine 192 may comprise at least one filter 519 to determine a gesture or gestures. A filter 519 comprises information defining a gesture 527 (hereinafter referred to as a "gesture"), and may comprise at least one parameter 529, or metadata, for that gesture. For instance, a throw, which comprises motion of one of the hands from behind the rear of the body to past the front of the body, may be implemented as a gesture 527 comprising information representing the movement of one of the hands of the user from behind the rear of the body to past the front of the body, as that movement would be captured by the depth camera. Parameters 529 may then be set for that gesture 527. Where the gesture 527 is a throw, a parameter 529 may be a threshold velocity that the hand has to reach, a distance the hand must travel (either absolute, or relative to the size of the user as a whole), and a confidence rating by the recognizer engine that the gesture occurred. These parameters 529 for the gesture 527 may vary between applications, between contexts of a single application, or within one context of one application over time.

Filters may be modular or interchangeable. In an embodiment, a filter has a number of inputs, each of those inputs having a type, and a number of outputs, each of those outputs having a type. In this situation, a first filter may be replaced with a second filter that has the same number and types of inputs and outputs as the first filter without altering any other aspect of the recognizer engine architecture. For instance, there may be a first filter for driving that takes as input skeletal data and outputs a confidence that the gesture associated with the filter is occurring and an angle of steering. Where one wishes to substitute this first driving filter with a second driving filter—perhaps because the second driving filter is more efficient and requires fewer processing resources—one may do so by simply replacing the first filter with the second filter so long as the second filter has those same inputs and outputs—one input of skeletal data type, and two outputs of confidence type and angle type.

A filter need not have a parameter. For instance, a "user height" filter that returns the user's height may not allow for any parameters that may be tuned. An alternate "user height" filter may have tunable parameters—such as to whether to account for a user's footwear, hairstyle, headwear and posture in determining the user's height.

Inputs to a filter may comprise things such as joint data about a user's joint position, like angles formed by the bones that meet at the joint, RGB color data from the scene, and the rate of change of an aspect of the user. Outputs from a filter may comprise things such as the confidence that a given gesture is being made, the speed at which a gesture motion is made, and a time at which a gesture motion is made.

The gestures library and filter parameters may be tuned for an application or a context of an application by a gesture tool. A context may be a cultural context, and it may be an environmental context. A cultural context refers to the culture of a user using a system. Different cultures may use similar gestures to impart markedly different meanings For instance, an American user who wishes to tell another user to "look" or "use his eyes" may put his index finger on his head close to the distal side of his eye. However, to an Italian user, this gesture may be interpreted as a reference to the mafia.

Similarly, there may be different contexts among different environments of a single application. Take a first-person shooter game that involves operating a motor vehicle. While the user is on foot, making a first with the fingers towards the ground and extending the first in front and away from the body may represent a punching gesture. While the user is in the driving context, that same motion may represent a "gear shifting" gesture. There may also be one or more menu environments, where the user can save his game, select among his character's equipment or perform similar actions that do not comprise direct game-play. In that environment, this same gesture may have a third meaning, such as to select something or to advance to another screen.

The gesture recognizer engine 192 may have a base recognizer engine 517 that provides functionality to a gesture filter 519. In an embodiment, the functionality that the recognizer engine 517 implements includes an input-over-time archive that tracks recognized gestures and other input, a Hidden Markov Model implementation (where the modeled system is assumed to be a Markov process—one where a present state encapsulates any past state information necessary to determine a future state, so no other past state information must be maintained for this purpose—with unknown parameters, and hidden parameters are determined from the observable data), as well as other functionality required to solve particular instances of gesture recognition.

Filters 519 are loaded and implemented on top of the base recognizer engine 517 and can utilize services provided by the engine 517 to all filters 519. In an embodiment, the base recognizer engine 517 processes received data to determine whether it meets the requirements of any filter 519. Since these provided services, such as parsing the input, are provided once by the base recognizer engine 517 rather than by each filter 519, such a service need only be processed once in a period of time as opposed to once per filter 519 for that period, so the processing required to determine gestures is reduced.

An application may use the filters 519 provided by the recognizer engine 192, or it may provide its own filter 519, which plugs in to the base recognizer engine 517. In an embodiment, all filters 519 have a common interface to enable this plug-in characteristic. Further, all filters 519 may utilize parameters 529, so a single gesture tool as described below may be used to debug and tune the entire filter system 519.

These parameters 529 may be tuned for an application or a context of an application by a gesture tool 521. In an embodiment, the gesture tool 520 comprises a plurality of sliders 523, each slider 523 corresponding to a parameter 529, as well as a pictorial representation of a body 525. As a parameter 529 is adjusted with a corresponding slider 523, the body 525 may demonstrate both actions that would be recognized as the gesture with those parameters 529 and actions that would not be recognized as the gesture with those parameters 529, identified as such. This visualization of the parameters 529 of gestures provides an effective means to both debug and fine tune a gesture.

Figure 6:
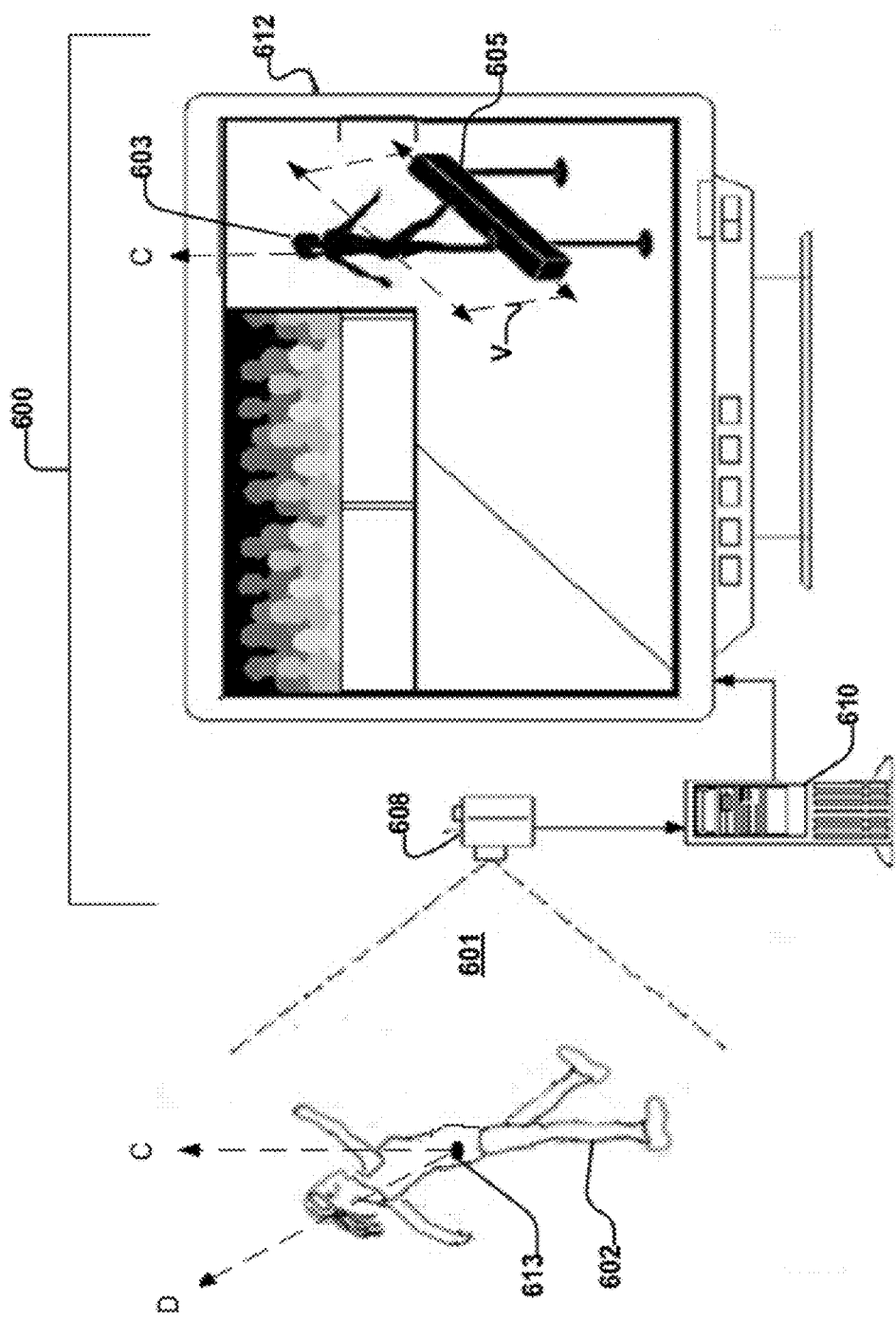
FIG. 6 illustrates a computer-controlled capture device system that provides a visual representation of the user on a display.

FIG. 6 illustrates an example of a system 600 that captures a target in a physical space 601 and maps it to a visual representation in a virtual environment. The target may be any object or user in the physical space 601. As shown in FIG. 6, system 600 may comprise a capture device 608, a computing device 610, and a display device 612. For example, the capture device 608, computing device 610, and display device 612 may comprise any suitable device that performs the desired functionality, such as the devices described with respect to FIGS. 1A-5B. It is contemplated that a single device may perform all of the functions in system 600, or any combination of suitable devices may perform the desired functions. For example, the computing device 610 may provide the functionality described with respect to the computing environment 12 shown in FIG. 2 or the computer in FIG. 3. As shown in FIG. 2, the computing environment 12 may include the display device and a processor. The computing device 610 may also comprise its own camera component or may be coupled to a device having a camera component, such as capture device 608.

FIG. 6 represents the user's 602 motion at a discrete point in time and the display 612 displays a corresponding display of a visual representation 603 of the user at that point of time. The system 600 may identify a gesture from the user's motion by evaluating the user's position in a single frame of capture data or over a series of frames. The rate that frames of image data are captured and displayed determines the level of continuity of the displayed motion of the visual representation. Though additional frames of image data may be captured and displayed, the frame depicted in FIG. 6 is selected for exemplary purposes.

In this example, the user 602 in the physical space is the target captured by an RGB camera or depth camera 608, for example, that processes the image data and/or provides the image data to a computer, such as a computing device 610. The image data is interpreted for display of a visual representation 603, such as an avatar. For example, the depth camera or, as shown, a computing device 610 to which it is coupled, may output to a display 612.

A virtual space may comprise a representation of a three-dimensional space that a user may affect—say by moving an object—through user input. That virtual space may be a completely virtual space that has no correlation to a physical space of the user—such as a representation of a castle or a classroom not found in physical reality. That virtual space may also be based on a physical space that the user has no relation to, such as a physical classroom in Des Moines, Iowa that a user in any other location has never seen or been inside. For purposes of this example, the user 602 is playing a gymnastics game. The avatar 603 that maps to the user's 602 motions is the portion of the display that is controlled by the user's 602 motions in the physical space. The background (e.g., audience, balance beam) are animations that are packaged with the gymnastics application and do not correlate to the physical space. Thus, the only aspect of the display that is controlled by motion in the physical space, in this example, is the avatar 603 that maps to the user's 602 motions.

The virtual space may comprise a representation of some part of the user's physical space. A depth camera that is capturing the user may also capture the environment that the user is physically in, parse it to determine the boundaries of the space visible by the camera as well as discrete objects in that space, and create virtual representations of all or part of that, which are then presented to the user as a virtual space. Thus, it is contemplated that other aspects of the display may represent objects or other users in the physical space. For example, the audience shown on the screen 612 may represent at least one or more users in the physical space, where the animation of the audience member on the screen 612 may map to the motions of a second user in the physical space.

In an embodiment, the virtual object corresponds to a physical object. The depth camera may capture and scan a physical object and display a virtual object that maps directly to the image data of the physical object scanned by the depth camera. This may be a physical object in the possession of the user. For instance, if the user has a chair, that physical chair may be captured by a depth camera and a representation of the chair may be inserted into the virtual environment. Where the user moves the physical chair, the depth camera may capture this, and display a corresponding movement of the virtual chair. With respect to the example in FIG. 6, a balance beam may exist in the physical space, and the display of a virtual balance beam may map to the dimensions of the physical balance beam.

Where two users are interacting with each other in the virtual environment, captured by a depth camera, that virtual space may also be a representation of the second user's virtual space. Thus, where two users are interacting with each other in the same physical space, the virtual space may include a representation of both users. A virtual object may correspond to a physical object of a second user. For example, if the user interacts with that virtual chair, those interactions (such as moving it) may be reflected in the virtual environment.

Depending on the scenario, it may be desirable that the virtual object maps to an object in the physical space as described above. The resulting animated interaction with the physical object can be mapped directly to the movement in the physical space, and the animated interaction may more accurately represent the interaction with the physical object. For example, the user may interact with an actual physical object in the user's physical space that is identified by the capture device and can be displayed in relation to an avatar in the game space.

Alternately, the props or objects used in a particular application may be displayed on the screen and the user can interact with the objects by positioning himself properly in the physical space to correspond to a location in the game space. For example, if a collection of balls in a bowling ball return were virtual only, but displayed in the game space of a bowling game application, a user could make a forward walking motion and turn in the physical space to control the avatar's walking and turning towards the bowling ball return displayed in the game space. By watching the displayed representation of the user, such as an avatar that is mapped to the user's gestures, the user can position himself or herself to make a ball selection.

It may be desirable that the object, and therefore the motion of the object, is entirely virtual. For example, an application involving the display of a fanciful character or object, or very large objects such as a spaceship or a house, may use animations that do not correlate to the objects in the physical space. In the example shown in FIG. 6, it may not be feasible to have a balance beam set up in the physical space and the balance beam may be virtual only.

In other scenarios, it may be desirable that the object is partially based on an object in the physical space but partially animated without corresponding to the physical space. For example, in another embodiment where the virtual object corresponds to a physical object, there may be situations where one is moved independently of the other. Thus, the virtual object may correspond to a physical object, but movement of the virtual object may be partially virtual. Given the physical chair and virtual chair above, where the user moves the virtual chair, it may be that the corresponding physical chair does not move. For instance, the user may throw a virtual ball at the virtual chair and the resulting collision will knock over the virtual chair. However, since no physical force was imparted on the physical chair, it will remain upright. Likewise, the physical object may be moved without moving its corresponding virtual object. For instance, where the user is in a large room, but the virtual space is comparatively smaller, the user may move the physical chair far to his right. If the virtual chair is already touching a virtual wall in the corresponding direction, it may not move though the physical chair did move.

In another example embodiment, the physical object may have characteristics that simulate aspects of an object desired for display purposes, such that aspects of the physical object may translate to the displayed object. The object in the physical space may have characteristics that simulate an object that the capture device can capture and scan to display a virtual object. For example, a mat on the floor may include a layout of the balance beam, having dimensions that map, in proportion, to the dimensions of the balance beam in the virtual space. However, the mat may be laid out on a flat surface such that the user performs the balance beam actions on a flat surface rather than on an actual physical balance beam. The physical object may correspond to the displayed virtual object such that interaction with the physical object translates to certain movement in the virtual space with respect to the virtual balance beam.

A physical object that differs from the corresponding object that is displayed may be desirable where the physical object would be too big for the physical space or is fanciful in nature. In the gymnastics example, it may be desirable to use a mat to simulate the use of a balance beam to eliminate the risk of a user falling off an actual balance beam. The user's interaction with the layout on the mat may be identified and analyzed by the camera for translation to the avatar's animation on the virtual balance beam. In addition, the use of the physical object that the camera can identify, such as the simulated balance beam in this instance, may enable the camera to align the user's motions to the animation of the avatar 603 with respect to the physical object (e.g., the virtual balance beam).

FIG. 6 depicts a user playing a gymnastics game, the user may be stepping, one foot in front of the other, and that motion may map to an avatar on the screen 612 that is walking on a virtual balance beam. FIG. 6 represents the user's motion 602 at a discrete point in time and the screen 612 displays a corresponding display of a visual representation 603 of the user at that point of time. The user 602 is a target in the physical space that is mapped to a display, represented by avatar 603, for the gymnastics application.

The line of gravity C is an imaginary vertical line that extends upward from the user's center of gravity 613. Line C indicates the user's line of gravity based on the user's center of gravity, or center of weight, where a symmetrical balance of the user's weight is achieved. The symmetrical balance is an equal distribution of weight between both legs. This line of gravity or balance shifts continually as the user moves. Line D represents the user's actual centerline. Line D shows a deviation of the user's centerline from the user's center of gravity. The difference between Line C and Line D is an indication that the user 602 is asymmetrically balanced. If the display provides a direct representation of the user's position in the physical space, including a postural or other imbalance, the result may be an unnatural looking animation.

A user's imbalance may be more prominent under certain conditions such as, for example, in the gymnastics game which involves movement of one foot in front of the other in an limited space. A user may simply have a natural posture imbalance that offsets the user's centerline from the center of gravity. The user may be a young child or lack experience in gesture-based systems, and some motions may be awkward for certain users, causing the user to be off-balance.

In a first instance, the virtual balance beam may map to the image data of an object (e.g., a balance beam) in the physical space. Thus, the dimensions of the virtual balance beam may based on the image data captured by the capture device, and the alignment of the avatar with the virtual balance beam may be based on the image data of both the user and the balance beam in the physical space. If the user falls off the balance beam in the physical space, such as by stepping too far left, the avatar is mapped to the same motion and the animation on the display 612 would be of the avatar falling off the virtual balance beam. The user's natural motions as a result of falling off the balance beam may be captured and displayed. Thus, the direct mapping of the user's motions to the virtual space would result in the avatar also falling off the beam and provide a realistic animation of what is occurring in the physical space.

As described above, a skeletal model may be generated by the capture device or computing environment. The visual appearance of an on-screen character may be changed in response to changes to the skeletal model being tracked. The computing environment may include a gestures library that may be used to determine controls to perform within an application based on positions of various body parts in the skeletal model. The skeletal model may include any information associated with adjustments that may need to be made thereto may be provided to a computing environment such as the computing environment 12 described above with respect to FIGS. 1A-4.

A user such as the user 18 described above with respect to FIGS. 1A and 1B playing an electronic game on a gaming console may be tracked by the gaming console as described herein. In particular, a body model such as a skeletal model may be used to model the target game player, and the body model may be used to render an on-screen player avatar. As the game player straightens one arm, the gaming console may track this motion, then in response to the tracked motion, adjust the body model accordingly. The gaming console may also apply one or more constraints to movements of the body model. Upon making such adjustments and applying such constraints, the gaming console may display the adjusted player avatar.

It may be desirable to modify certain aspects of the image data captured by the capture device before mapping the user's motions or gestures to a respective avatar. In FIG. 6, each frame of image data may be parsed to produce a skeletal map of the user and gestures may be identified as described in relation to the skeletal map shown in FIG. 5A. Before mapping the image data to the visual representation on a screen, various parts of the skeletal map may be altered for animation purposes. As shown in FIG. 6, the user's 602 balance and/or posture deviates from the user's line of gravity, Line C. In this case, the user's upper body tilts to the left of the user's line of gravity. The capture device 608 may capture the user image data, and the computing device 610 may identify the deviation of the user's centerline from the user's line of gravity, Line C, and make corrections for the animation of the user feedback that maps to the user's gestures. As displayed, the avatar 603 represents the user but with a corrected balance. The avatar's centerline is in line with the line of gravity.

It may be desirable to incorporate a modification or correction to the image data to provide an animation that is more pleasing for the user to observe on the screen. The corrected animation of the user may appear more natural or represent the user's desired motions. The user may prefer to see a representation of his or her motions that is more natural or better represents the user's desired motions versus the user's actual motion. Thus, in some instances, the animation may be modified to provide a more pleasing animation to the observing user.

In an example scenario, the user's motions do not correspond to a particular gesture or do not control an aspect of the application or operating system. However, the user's motions may still be mapped to an avatar for animation purposes.

Having no effect or control on the application other than providing an animation to the user, it may be desirable to enhance the visual appearance of the animation, such as by giving the avatar a natural balance or mapping the user's motions to an avatar with smoother and more advanced motions.

For motion that is recognized by the gesture recognition engine, the parameters in a gesture filter may provide for wider tolerances for gesture recognition, such that a user's motions may be recognized as a particular gesture based on a wider variance of input to the capture device, such as the joint data. The parameters and range of tolerances that correspond to a gesture may vary based on a user's performance, the executing application, a context, a skill level, or the like. For example, a parameter for an overhand football throw in a "beginner" skill level may comprise a larger volume of space through which the hand can travel such that the system associates the gesture with an overhand throw and processes it accordingly. By varying certain parameters associated with a gesture, the system can accommodate less experienced players.

The user's gesture may indicate success or failure in the executing application. For example, in the gymnastics game, the user's motions may be mapped directly to the avatar. A detection that the user's motions would place the avatar in a position that does not correspond to the virtual balance beam, or any gesture filters that correspond to the gymnastics game, may result in a failure in the game. It may be desirable to modify the image data prior to animation such that the user's motions do not correspond to a failure in the game. For example, if the user is inexperienced, it may be desirable to modify the image data of the user to avoid a failure in the game. The modifications may be sufficient to correct the image data such that it is recognized by a gesture recognition engine or satisfies the parameters of a gesture filter. The model of the user may represent the corrected image data, translating to a visual representation that displays the correction.

In other circumstances, it may not be desirable to map the user's motions directly to the display, despite a successful gesture identification. For example, where the tolerances for error may be larger for an inexperienced player, for example, the user's actual motions may be that much more varied for the particular gesture. It may be desirable to clean up the motion data before mapping it to the avatar. For example, parameters for an overhand football throw in a "beginner" skill level may comprise a specified range for arm velocity and a certain volume of space through which the arm must travel. The volume of space for the beginner may be a larger volume of space than the volume of space set for a more experienced user and the range of velocities for the arm motion may be a larger range for the beginner. Thus, the beginner user's elbow and arm movement, for example, may be a slower motion and the elbow and arm motion may be awkward. However, the user's movement, based on the wider tolerance for gesture identification, may still be recognized as an overhand throwing gesture.

It may not be desirable to map the user's motions directly to the visual representation of the user, but, using the user's motions as a foundation for the animation, providing an animation of the user's motion that is modified for a cleaner visual representation of the overhand throwing motion. Despite the differences in various users' motions in the physical space, the animation of each user may be corrected to demonstrate a cleaner animation. Even though the user's motions may be awkward, the image date could be modified to adjust the user's image data so the corresponding motion mapped to an avatar is displayed in a smaller, more confined space, that more accurately represents an overhand throwing motion. Thus, a beginner user may be less frustrated if the avatar that represents the user looks more competent, and a beginner and an experienced user can both enjoy an animation that is pleasing to the observing user.

As shown in FIG. 6, the virtual balance beam 605 shown on the screen 612 in FIG. 6 may not be an animation that directly maps to an object in the physical space. The virtual balance beam 605 may correspond to an object in the physical space that simulates the surface of the balance beam, such as a layout on a mat, as described above. In another example, the balance beam 605 on the screen 612 may be entirely based on an animation of a balance beam and not map to any objects in the physical space. In both examples, the user 602 may still control the interaction of the avatar 603 with the virtual balance beam 605 by interacting with either the mat in the physical space 601 or by observing the avatar 603 and the virtual balance beam 605 on the screen to determine how to motion in the physical space 601. However, in both examples, a direct mapping of the user's 602 motions may not provide for a realistic animation. The user 602, mapped to the avatar 604 that is currently on the virtual balance beam 605, may move in such a way in the physical space 601 that does not correspond to the virtual balance beam 605. For example, if the user 602 steps to the left in the physical space 601, that would cause a user to fall if the user were actually on a balance beam; however, the user may still be on a flat surface in the physical space and therefore not fall. In the virtual space the avatar 603 would appear to be floating to the left of the virtual balance beam.

There are various methods of applying corrective data to output a modified animation that stems from the user's motions. For example, the modification may be based on error bands around a target or captured motion, corrective data may include a snap to perfection model, differential correction, or adaptive magnetism, for example. Error bands and differential correction are discussed with respect to FIGS. 6 and 7, differential correction is discussed with respect to FIG. 8, magnetism principles are discussed with respect to FIG. 9. While these are examples of corrective data that may be applied to the image data captured by a capture device, it is noted that any suitable method of modifying the user's motions for realignment or better animation purposes are contemplated.

FIGS. 7A-7C depict an example of the techniques that may be employed to modify a target's image data prior to displaying an animation that maps to the target. FIG. 7A represents a 3-dimensional coordinate system 704, with coordinates x, y, and z, that corresponds to the 3-dimensional physical space. FIG. 7A also depicts an example of an error band 706 that may be compared against the user's captured motion. FIGS. 7B and 7C depict an example embodiment for applying differential correction techniques.

Figure 7:
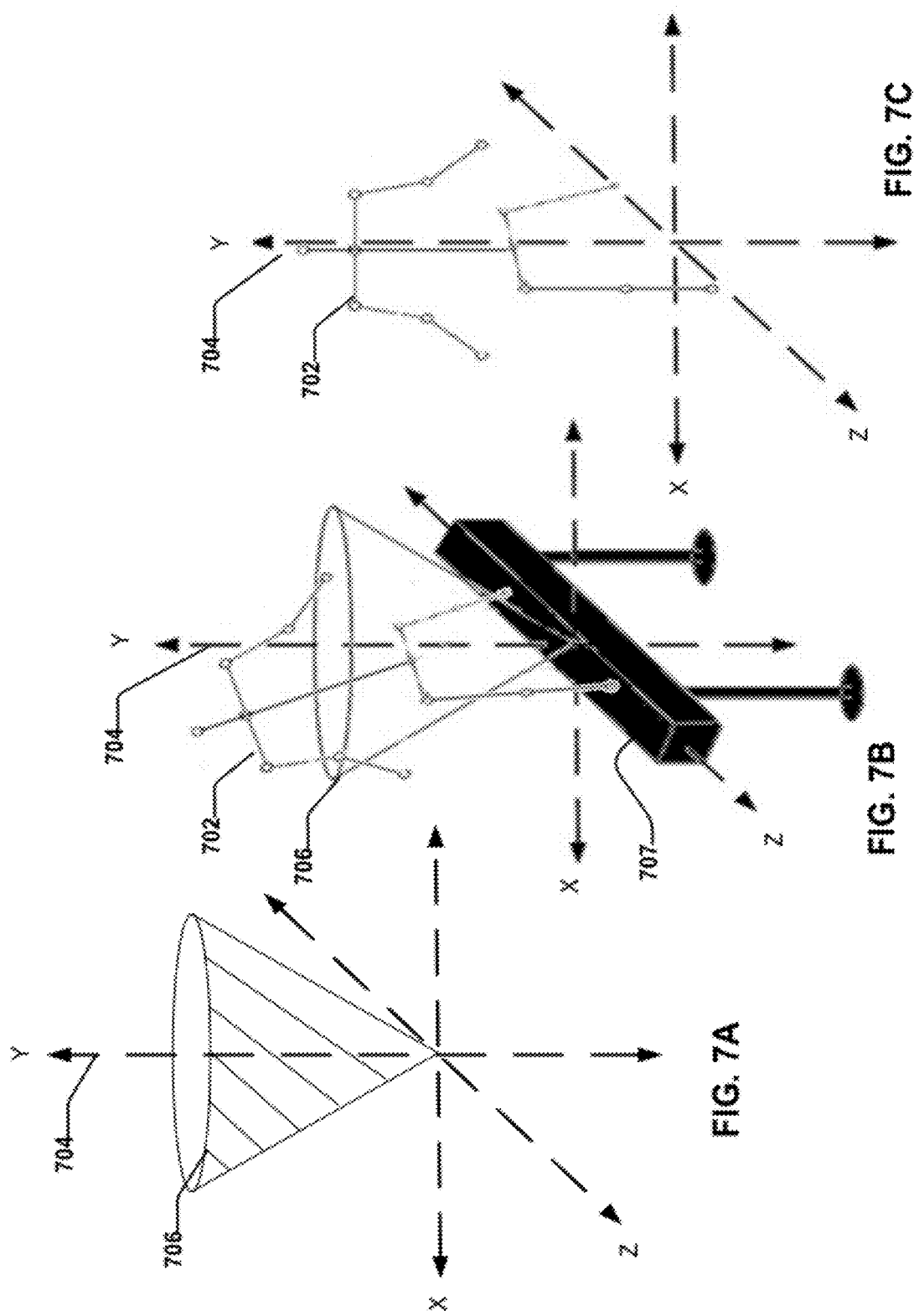
FIGS. 7A-7C illustrate an example embodiment for applying corrective data to a visual representation of a target or captured motion.
Figure 8:
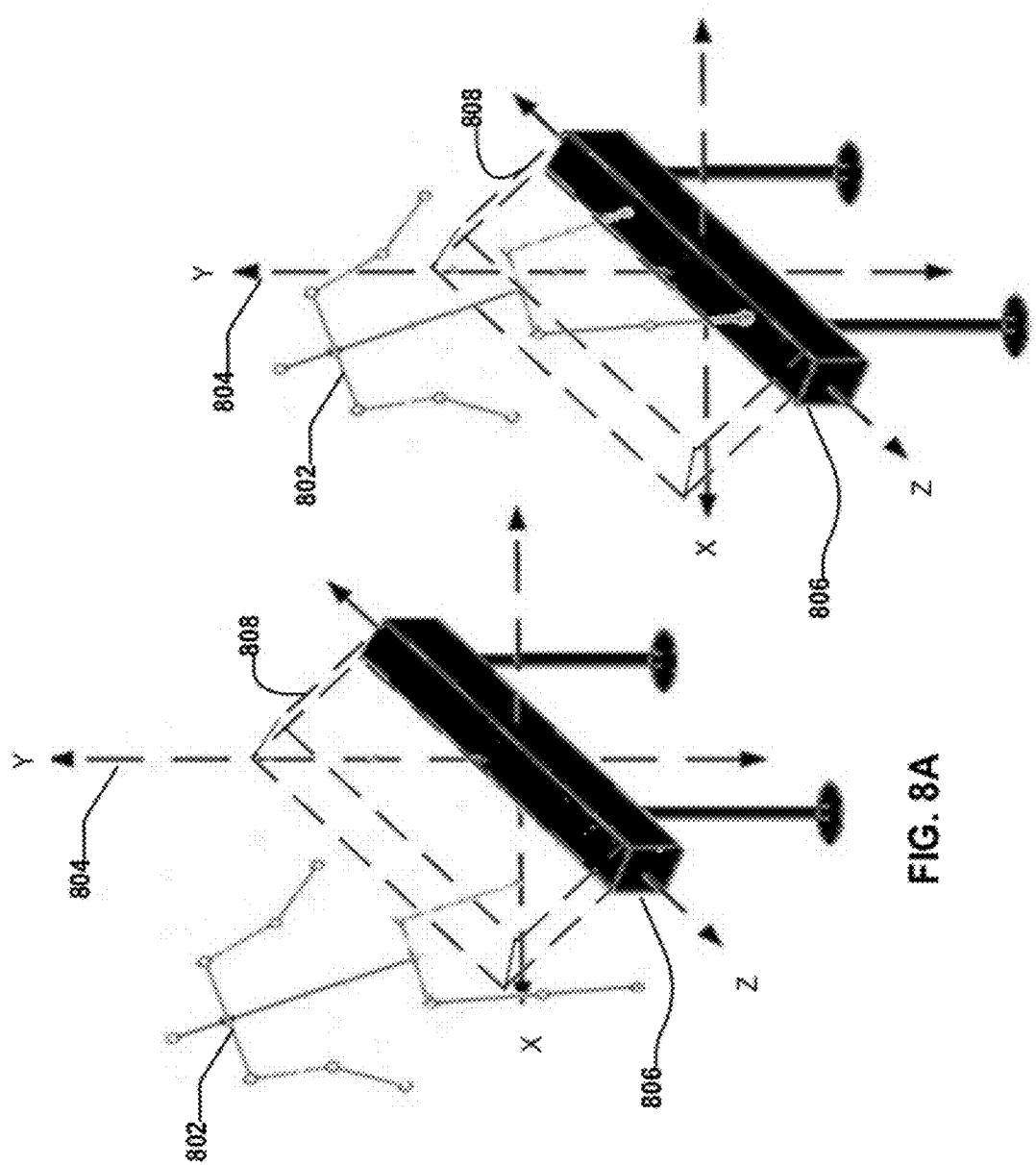
FIGS. 8A-8B illustrate another example embodiment for applying corrective data to a visual representation of a target or captured motion.

According to the example embodiment, the target is a human target, but the target may also be a human target with an object, two or more human targets, or the like, that may be scanned to generate a model such as a skeletal model 702, a mesh human model, a flood filled model, a depth model, or any other suitable representation thereof The model 702 shown in FIG. 7 is a skeletal model, and may be used for generating a visual representation of the user for interacting with an application that may be executed by the computing environment 12 described above with respect to FIGS. 1A-1B. According to an example embodiment, the target may be scanned to generate the model when an application may be started or launched on, for example, the computing environment 12 and/or periodically during execution of the application on, for example, the computing environment 12.

As described above, the target may include the user 602 described above with respect to FIG. 6. The target 602 may be scanned to generate a skeletal model 702 of, for example, the user 602 that may be tracked such that physical movements or motions of the user 602 may act as a real-time user interface that adjusts and/or controls parameters of an application such as an electronic game. The tracked motions of a user 602 may be used to move an on-screen character or avatar in an electronic role-playing game; to control an on-screen vehicle in an electronic racing game; to control the building or organization of objects in a virtual environment; or to perform any other suitable controls of an application.

According to an embodiment, depth information may be received. For example, the target recognition, analysis, and tracking system may include a capture device 608 as shown in FIG. 6. The capture device may capture or observe a scene that may include one or more targets. The human target may be scanned to provide measurements such as length, width, or the like associated with one or more body parts of a user such as the user 602 described above with respect to FIG. 6, such that an accurate model 702 of the user may be generated based on such measurements.

The computing device 610 may compare captured motion, interpreted and mapped to the skeletal model 702, to an error band 706 and apply corrections to the captured motion prior to animation. For example, the coordinate system may be aligned with the user's captured motion, where the y-axis is the direction that corresponds to the user's line of gravity, Line C, shown in FIG. 6. As shown in FIG. 7B, the user's captured motion shown in the snapshot of FIG. 6 is compared to the virtual 3-dimensional coordinate system that corresponds to the physical space, including the error band.

The z coordinate represents the plane along which the surface of a virtual balance beam 707 lies. Coordinate y represents the up direction in the physical space, and, in this example, coordinate y is also used to correspond to the user's line of gravity. The error band 706 is positioned around the user's center of gravity, or coordinate y. The error band 706 comprises an area that represents varying deviations from the user's line of gravity. As described with respect to FIG. 7C, if the user's deviation from the line of gravity falls within this error band 706, the system may apply corrections to the image data for animation purposes.

As also shown in FIG. 6, Line D represents the user's centerline, indicating that the user is off-balance. The computing device 610 may parse and process the image data, and based on weights and balances, may identify that the user is off-balance. In this example, the user's centerline, shown by the skeletal model 702, falls within the error band 706. Thus, differential correction may be applied to modify the alignment of the skeletal model 702 that corresponds to the user. The reference line for differential correction, in this example, is the y-axis, or the user's line of gravity, Line C. Adjusting the centerline of the user's upper body to align with the user's line of gravity, prior to animating the user's captured motion, provides for an animation that shows the user in a balanced state. While the alignment of the user's upper body may be adjusted to align with the y-axis, as shown by the alignment of the skeletal model of the user 702 with respect to the coordinate system 704, the remaining portions of the user's position and motion may map directly to the captured motion. For example, the animation of the user's lower body may still correspond directly to the motion of the lower body captured by the capture device. Furthermore, the computing device may identify parts of motion that are key and that are not key, applying correction to the motion that is important for the application.

The system may reposition or realign a joint of the skeletal model 702 to correspond to a desired visual representation of the skeletal model. For example, a system, such as system 600, may compare the joint position in the physical space to a corresponding desired position in a virtual 3-dimensional coordinate system. The system 600 may identify a deviation of a joint position of at least one joint in the model from a desired position of the joint in the virtual 3-dimensional coordinate system 702. Corrective data may be applied in the form of adjusting any of the X, Y, and Z positions of the joint where the X, Y, or Z position deviates from the desired X, Y, or Z position, respectively, by a deltaX (dX), deltaY (dY) or deltaZ (dZ) amount, respectively.

The modification may not give the avatar symmetrical balance, as asymmetrical balance may be more realistic and more positively correspond to the user, the user's motions, intentions, and natural poses. However, differential correction within a certain range may provide a more pleasing animation.

FIG. 7C depicts the correction of the user's upper body, shown by skeletal model 702, to align to the user's line of gravity, Line C. Thus, using an error band 706 and differential correction techniques, the animation of the user shown on the screen 612 in FIG. 6 may be a cleaner animation of the user, where the user appears to be in balance. The computing device modifies the skeletal model to be upright and in line with the user's natural center of gravity FIGS. 8A-8B depict another example of differential correction. The representation of a user, 802, is shown with respect to the 3-dimensional virtual coordinate system, 804, that corresponds to the 3-dimensional physical space. In this example, as described above, a mat on the floor may include a layout of the balance beam for use when executing a gymnastics game. The mat layout may have dimensions that map, in proportion, to the dimensions of the balance beam 806 in the virtual space. The mat may be laid out on a flat surface such that the user, represented by skeletal model 802, performs the balance beam actions on a flat surface rather than on an actual physical balance beam. The physical object may correspond to the displayed virtual object 806 such that interaction with the physical object translates to certain movement in the virtual space. In another example, the balance beam may be entirely virtual, where the user's interaction with the virtual balance beam may be solely based on the user's observation of the balance beam on the screen.

In either case, the mat or the user's position in the physical space may not properly correspond with the spatial relationship of the virtual balance beam 806. It may be desirable to modify the user's captured position, shown by model 802, to properly correspond to the virtual balance beam. Thus, the user's position or the mat's position in the physical space may be initialized with respect to the desired position of the avatar with respect to the virtual balance beam. For example, the skeletal model 802 that maps to the user's motions may not be properly aligned with the virtual balance beam 806, as shown in FIG. 8A. Methods of differential correction may be used by analyzing the spatial relationship of the virtual objects in the scene and the animation of captured motion. The virtual box, 808, may be the reference for differential correction, where the user's or mat's initial position is aligned with the virtual balance beam by initializing the user's position in the physical space to the virtual box 808 in the game space.

Further, as the user moves in the physical space to correspond to the small surface space of the balance beam 806, the captured motion may be modified within a certain virtual space. For example, if the user performs a cartwheel in the physical space, the user's motions may be mapped to the model 802 and realigned to occur within a virtual box 808 positioned around the virtual balance beam 806. Regardless of the positioning of the user in the physical space, the virtual box, 808, may automatically realign the user's motions with the virtual balance beam 806. Thus, even if the user's motion cartwheel is not performed in straight line, the captured motion mapped to model 802 may correspond to the virtual box 808 such that the corresponding avatar's motions occur on the surface area of the virtual balance beam 806. Thus, the user's captured motion may be mapped to model 802, modified to occur within the spatial limits of the virtual box 808 such that an animation of the user's motion occurs on the virtual balance beam 806. Thus, the user's motion may align the avatar to the virtual balance beam 806, regardless of any deviation of that virtual box 808 as it would correspond to physical space. The correction avoids the example described above, where the avatar would appear to be floating to the left of the displayed balance beam 806 if the visual representation mapped directly to the use's captured motion.

The motion may be realigned with the virtual box, 808, by any appropriate method. For example, binary snapping to perfection may snap the user's motion to the virtual space. Binary snapping motion may be useful during initialization of the user's motion to the virtual space, prior to the animation of the user. In this manner, if a significant amount of modification must be made to initialize the user's position to the virtual space, the visual representation of the user doesn't make a sudden movement on the screen. It may be desirable in other circumstances to provide a smooth transition between the user's captured motion and the motion desired based on the differential correction. For example, if the visual representation of the user is shown and mapping to the user's cartwheel motion in the physical space, differential correction techniques may apply to modify the motion of the user to align with the virtual box 808. The correction to the user's captured motion may be smoothed to the virtual box 808 such that the correction to the animation is not jerky but rather appears smooth for the observation of the user.

The amount of differential correction applied may correspond to a skill setting that is associated with a particular user. For example, a young child's cartwheel in the physical space may be extremely off-line and off-balance. Wider tolerances may be set for the deviation of the user's motion to the virtual box 808 for user's at a lower skill setting.

The computing device may use the virtual box, 808, or grid for differential correction. The virtual box, 808, may be coordinates, such as x, y, and z coordinates, that correspond to the physical space. The virtual box 808 may be represented in 3-dimensions to correspond to the 3-dimensional physical space that is captured by the capture device. However, it is contemplated that the virtual box 808 could be defined with respect to dimensions other than 3-dimensional.

Figure 9:
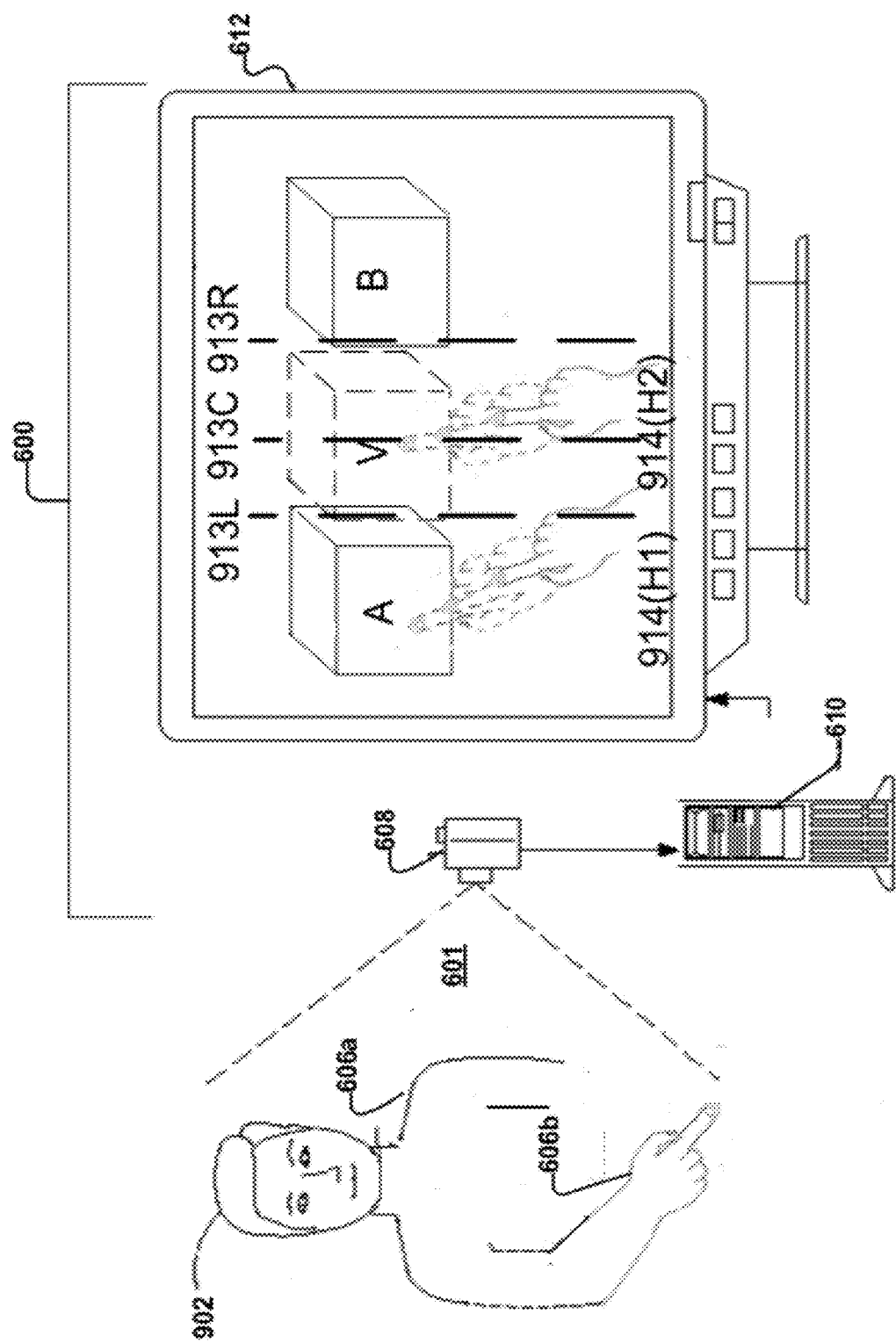
FIG. 9 illustrates another example embodiment for applying corrective data to a visual representation of a target or captured motion.

FIG. 9 depicts another example of the system 600 from FIG. 6 that can incorporate techniques for modifying a user's captured motion for animation purposes. The capture device 608 may capture a target, such as a human 902 or an object, or capture motion of the target, and compare the image data against differential correction data. Prior to animating the captured motion, differential correction techniques may be applied to the model or image data that represents the captured motion or gesture. The computing device 610 can model and display a representation of a user 902, such as in the form of an avatar or a pointer on a display, such as on a display device 612. Display device 612 may include a computer monitor, a television screen, or any suitable display device. For example, a camera-controlled computer system may capture user image data and display user feedback on a television screen that maps to the user's gestures. The avatar's motion can be controlled directly by mapping the avatar's movement to those of the user's movements. The user's gestures may control certain aspects of the application.

In this example, magnetism principles are applied. Adaptations with respect to target recognition, analysis, and tracking system may be made by the computing environment 12. For example, virtual representations of a target, such as a human or object in the physical space, may appear to magnetize, or have an attraction, towards a position on the screen. As used herein, magnetize refers to the snapping or smoothed motion of at least a portion of the animation to a desired position. The attraction to a particular position may more efficiently interpret a user's motions and/or more accurately predict a user's motions. The desired position therefore acts as a magnet, and the animation of the motion may snap to or be smoothed towards that magnet.

Two examples are demonstrated in FIG. 9. The first is in relation to the hand, 914(H1). The hand, 914(H1), corresponds to the user's 902 hand in the physical space. For simplicity purposes, the object of the application in this example is to select a box, A or B. The same techniques may relate to more complex scenarios, however, such as controlling aspects of an operating system, making selections or moving a cursor while running a program, such as a spreadsheet, a word processing document, or the like.

Consider the example of a user 902 motioning in the physical space 601 to correspond to a virtual world. If box A was a doorknob, the user 902 may walk towards the door and reach in the physical space 601 for the doorknob. However, the user 902 may not have walked far enough, where the walking gesture may be performed by a motion in the physical space 601 that translates to a walking motion of the avatar, to align the avatar with the doorknob. Thus, as the user 902 makes a motion to turn the doorknob in attempts to make the avatar reach for and turned the doorknob, the avatar may be needlessly motioning in the virtual space as it does not correspond to the door. However, by applying correction techniques, such as differential correction or magnetism, the position of the avatar's hand may be smoothed or binary snapped to the door. In other words, the avatar's motion may be smoothed to correspond to the doorknob even if the physical position of the user is not correct.

In FIG. 9, hand 914(H1) corresponds to the user's hand motions in the physical space. With respect to the user's hand, hand 914(H1) is mapped to the captured motion of the user's hand in the physical space. The user 902, however, may be motioning in the physical space 601 in a manner that does not equate to the desired corresponding motion in the virtual space. However, if the computing device 610 detects that the user's hand is oriented and turned in such a way that it corresponds to the left of virtual Line 913L in the virtual space, box A may serve as a magnet to which the hand, 914(H1), magnetizes. The user selection of box A may be recognized even though the user's hand 606 in the physical space is not aligned or positioned properly with respect to the virtual box A. The system recognizes that the user's hand 606 is moving towards the left of the screen and compares the user's captured motion to the virtual dimensions of the boxes and the line 913L.

Another example depicted in FIG. 9 incorporates the use of a third box, virtual box V. In this example, a more refined evaluation of the user's 902 motion in the physical space may be determined by using a third magnet, the virtual box V. In this example, if the user's hand 606 motion is translated to motion, virtually, of hand 914(H1) to 914(H2) between lines 913L and 913R, the virtual box V may magnetize the animated motion at line 913C. Thus, the user may select the space between boxes A and B.

The amount of magnetism applied may correspond to player accuracy or user skill settings. For example, consider a young child attempting to select box A. The young child's motions, as they correspond to the virtual space, may be a further distance from box A but still magnetize to the box. The "strength" of the magnet of box A, or the level of attraction, therefore, may vary depending on a user's accuracy or skill setting.

In an example embodiment, a user's profile may indicate that the user typically operates with large gestures, such as large sweeping motions. The target recognition, analysis, and tracking system may adapt with expectations that fine or precise gestures may be ignored. If the user's profile or size indicates that the user is very young, and thus more likely to move in an erratic fashion, the target recognition, analysis, and tracking system may adapt its response to movements or smooth or aid the motions of the user. Any other suitable adaptation based on distance or a user's profile may be incorporated.

There are many scenarios in which it is desirable to modify the user's captured motion prior to animation. Despite the user's actual posture or imbalance in the physical space, it may or may not be desirable that the animation does not look off balance. A correction may be made for display purposes, providing a more pleasing animation of the user. Thus, for a more pleasing display, the interpretation of the user's motion from the image data may be modified. Consider a throwing action that comprises a series of movements; very young children and some adults throw in a very distinctive way which may be a very different action from what we expect to see from an experienced baseball player throwing a ball, for example. It may be desirable that the motion of the avatar mimics the motion that a professional baseball player would make. A small child that does not throw very well yet may be visually represented by an avatar that not only incorporates aspects of the child's captured motion, but modifies the avatar to some extent to enhance the display of the child.

In some circumstances, it is desirable that a player performs a certain motion or it may be desirable to animate a motion in a certain way, and so the system may correct the translation of the motion to the screen. The success/failure in the application may still correspond to the user's captured motion, despite any enhancements to the visual representation of the captured motion. A failure may become a success as a result of the modification and the success/failure in the application may correspond to the enhancements. In other examples, the success/failure may not be pertinent to the particular aspect of the application. Even if the captured motion is a gesture that controls an aspect of the application or is an indication of success or failure, such as in a game application, if the control is still identified and occurs based on an interpretation of the captured motion, it may be desirable that the corresponding visual representation is enhanced to display more fluid and smooth motion than that which the user is performing in the physical space.

For example, considering the gymnastics example shown in FIGS. 6-9, a motion in the physical space that would correspond to falling off a balance beam may be modified for display purposes—e.g., the motion may be magnetized to occur around the user's center of gravity or to a defined virtual space. Thus, the user can have a misstep in the physical space that does not translate to the animation of the user, and the user can return to a balanced position and resume activity in the physical space that corresponds to the virtual balance beam without a disruption to the animation.

Another situation for which it may be desirable to correct the image data of the captured motion may be due to the changes that occur to the motions or poses that a user makes to convey a gesture. For instance, the user may become fatigued and no longer jump as high as at the start of his session to convey a jump gesture. Also, the user may through practice become better at making the motion or pose associated with a gesture, so the acceptable variations for a parameter may be decreased so that two different gestures are less likely to be recognized by one set of motions or pose. The application may also wish to give the user a more challenging experience as he becomes more adroit, so as not to lose his attention. In another embodiment, the application may give the user finer control over the gestures or more gestures to use. For instance, a beginner at a tennis video game may only be concerned with hitting the ball over the net, and not with putting any spin on it. However, as the tennis application detects that the user is improving, it may introduce or recognize gestures for top-spin or back-spin in addition to the standard hit. Similarly, the amount of corrective data applied to the image data may change as the user fatigues or as the user improves.

Figure 10:
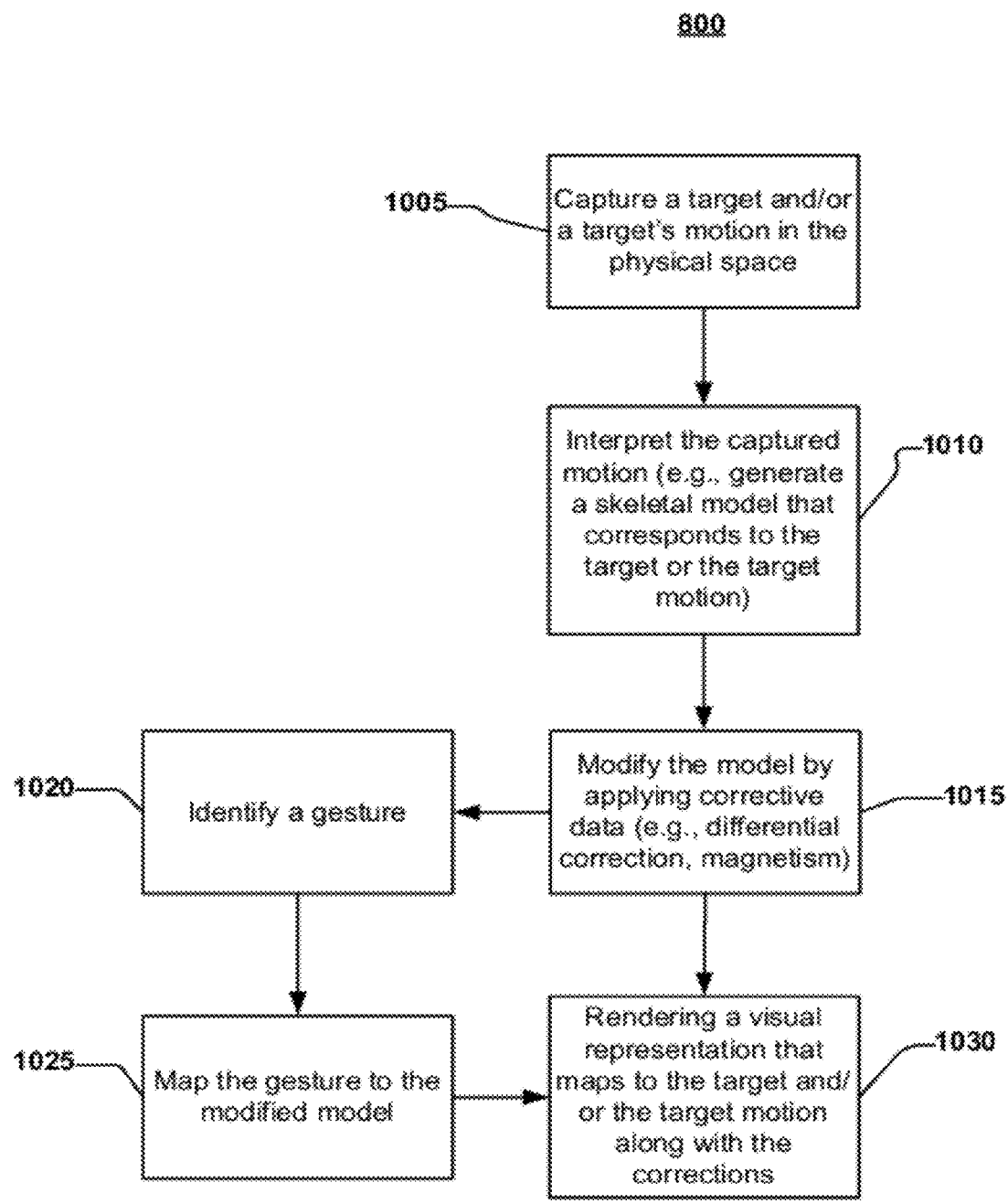
FIG. 10 depicts an example flow diagram for a method of applying corrective data to a model for rendering a visual representation that corresponds to the corrective data.

FIG. 10 depicts an example flow of a method of correcting captured motion. At 1005, a system, such as the target recognition, analysis, and tracking system 10 described with respect to FIGS. 1A-B may capture a target or a target's motion in the physical space.

The example method 1000 may be implemented using, for example, the capture device 20 and/or the computing environment 12 of the target recognition, analysis, and tracking system 10 described with respect to FIGS. 1A-2. According to an example embodiment, the target may be a human target, a human target with an object, two or more human targets, or the like that may be scanned to generate a model such as a skeletal model, a mesh human model, or any other suitable representation thereof The model may then be used to interact with an application that may be executed by the computing environment 12 described above with respect to FIGS. 1A-1B. According to an example embodiment, the target may be scanned to generate the model when an application may be started or launched on, for example, the computing environment 12 and/or periodically during execution of the application on, for example, the computing environment 12. A capture device, such as captured device 20, may receive image data about a scene, the image data may be parsed and interpreted to identify a target in the scene. A series of images may be interpreted to identify motion of the target.

According to one embodiment, a computer-controlled camera system, for example, may measure depth information related to a user's gesture. For example, the target recognition, analysis, and tracking system may include a capture device such as the capture device 20 described above with respect to FIGS. 1A-2. The capture device may capture or observe a scene that may include one or more targets. In an example embodiment, the capture device may be a depth camera configured to obtain depth information associated with the one or more targets in the scene using any suitable technique such as time-of-flight analysis, structured light analysis, stereo vision analysis, or the like. Further, the depth information may be pre-processed, either as a depth image generated from depth data and color data, or even parsed depth image data, such as having skeletal mapping of any user in the image.

At 1010, the capture device or a computing device coupled to the capture device, such as computing environment 12, may identify a target in the scene or interpret the captured motion. In an example embodiment, the computing environment 12 generates a model of the image data. If a target is identified as a human, the capture device may perform a scan of the target to generate a skeletal model, such as that shown in FIG. 5A.

For example, as described above, the target may include the user 18 described above with respect to FIGS. 1A-1B. The target may be scanned to generate a skeletal model of, for example, the user 18 that may be tracked such that physical movements or motions of the user 18 may act as a real-time user interface that adjusts and/or controls parameters of an application such as an electronic game. For example, the tracked motions of a user may be used to move an on-screen character or avatar in an electronic role-playing game; to control an on-screen vehicle in an electronic racing game; to control the building or organization of objects in a virtual environment; or to perform any other suitable controls of an application.

At 1015, the capture device controlled system may modify the model by applying corrective data. In the instance that the target is a human, modifying a skeletal model may be the readjustment or alignment of a joint or joints, such as repositioning the spine of the skeletal model. As described above, example embodiments comprises applying corrective data via magnetism or via differential correction techniques. The system may render a visual representation that maps to the target or the target's motion that includes the modifications due to the applied corrective data, at 1030.

The system may recognize a gesture in the captured motion of a user at 1020. The gesture may be mapped to the modified model at 1025. Thus, at 1030, the display of the visual representation that maps to the target and/or the target's motion may include a representation of the target or the motion that corresponds to a recognized gesture. For example, if the joints in a skeletal model that maps to a user in the scene are readjusted, such as straightening out the spine of the skeletal model, the gestures may be mapped to the modified model. In the gymnastics example above, the gesture may be simply walking on the balance beam from one end to the other. The system may correct for imbalances, postural or positional, of the user by modifying the joints in the skeletal model that represents the user. The gesture of walking from one end of the balance beam to the other may be mapped to the modified model such that the walking aspect of the user's captured motion is mapped to a skeletal model that has a straightened out spine.

It is noted that the target recognition, analysis, and tracking system 10 is described with regards to an application, such as a game. However, it should be understood that the target recognition, analysis, and tracking system 10 may interpret target movements for controlling aspects of an operating system and/or application that are outside the realm of games. For example, virtually any controllable aspect of an operating system and/or application may be controlled by movements of the target such as the user 18.

It should be understood that the configurations and/or approaches described herein are exemplary in nature, and that these specific embodiments or examples are not to be considered limiting. The specific routines or methods described herein may represent one or more of any number of processing strategies. As such, various acts illustrated may be performed in the sequence illustrated, in other sequences, in parallel, or the like. Likewise, the order of the above-described processes may be changed.

Furthermore, while the present disclosure has been described in connection with the particular aspects, as illustrated in the various figures, it is understood that other similar aspects may be used or modifications and additions may be made to the described aspects for performing the same function of the present disclosure without deviating therefrom. The subject matter of the present disclosure includes all novel and non-obvious combinations and sub-combinations of the various processes, systems and configurations, and other features, functions, acts, and/or properties disclosed herein, as well as any and all equivalents thereof. Thus, the methods and apparatus of the disclosed embodiments, or certain aspects or portions thereof, may take the form of program code (i.e., instructions) embodied in tangible media, such as floppy diskettes, CD-ROMs, hard drives, or any other machine-readable storage medium. When the program code is loaded into and executed by a machine, such as a computer, the machine becomes an apparatus configured for practicing the disclosed embodiments.

In addition to the specific implementations explicitly set forth herein, other aspects and implementations will be apparent to those skilled in the art from consideration of the specification disclosed herein. Therefore, the present disclosure should not be limited to any single aspect, but rather construed in breadth and scope in accordance with the appended claims. For example, the various procedures described herein may be implemented with hardware or software, or a combination of both.

What is claimed:

1. A system for modifying data representative of captured motion, the system comprising:
   a processor; and
   a memory communicatively coupled to the processor when the system is operational, the memory bearing processor-executable instructions that, when executed on the processor, cause the system to at least:
      receive image data of a scene, the image data including data representative of captured motion, the image data having been captured with a camera;
      generate a model of the captured motion based on the image data;
      modify at least a portion of a size of the model to constrain the model to an avatar; and
      render the avatar using the modified model.

2. The system of claim 1, wherein the captured motion corresponds to a first user and the image data includes data representative of a second captured motion of a second user, and wherein the memory further bears processor-executable instructions that, when executed on the processor, cause the system to at least:
   generate a second model based of the second captured motion based on the image data;
   modify at least a portion of a size of the second model to constrain the second model to a second avatar, a size of the avatar and a size of the second avatar being the same; and
   render the second avatar based on the modified second model.

3. The system of claim 1, wherein the memory further bears processor-executable instructions that, when executed on the processor, cause the system to at least:
   detect an asymmetrical balance of the model representative of the captured motion, the rendered avatar being a visual representation that is more symmetrically balanced than the model representative of the captured motion.

4. The system of claim 1, wherein the memory further bears processor-executable instructions that, when executed on the processor, cause the system to at least:
compare the data representative of the captured motion to a virtual object and detecting a misalignment between the model of the captured motion and the virtual object, the rendered avatar being a visual representation that is aligned with the virtual object.

5. The system of claim 1, wherein the model is a flood model, skeletal model, a depth model, or a mesh human model.

6. The system of claim 1, wherein the instructions that, when executed on the processor, cause the system to at least apply corrective data further cause the system to at least:
apply an attraction from at least the a portion of the model to a virtual magnet.

7. The system of claim 1, wherein the instructions that, when executed on the processor, cause the system to at least apply corrective data further cause the system to at least:
apply differential correction to modify the model to correspond to a virtually defined space.

8. The system of claim 1, wherein the instructions that, when executed on the processor, cause the system to at least apply corrective data further cause the system to at least:
apply binary snapping the at least a portion of the model to a desired position.

9. The system of claim 1, wherein the memory further bears processor-executable instructions that, when executed on the processor, cause the system to at least:
scan a target to generate the model, wherein the model is a skeletal model; and
wherein the instructions that, when executed on the processor, cause the system at least apply corrective data to the at least a portion of the model further cause the system to at least apply corrective data to the skeletal model.

10. The system of claim 1, wherein the image data comprises data for a series of images that represent the captured motion, the corrective data being applied to the model of the target in each of the series of images.

11. The system of claim 1, wherein the memory further bears processor-executable instructions that, when executed on the processor, cause the system to at least:
detect a similarity between the captured motion and an ideal motion, the rendered avatar being a pre-authored model that represents the ideal motion.

12. A method for rendering a visual representation of a gesture, the method comprising:
receiving image data of a scene, the image data comprising data representative of a user-performed gesture in the physical space, the image data having been captured by a capture device;
mapping the image data to a model representative of the user;
modifying at least a portion of a size of the model to constrain the model to an avatar;
mapping the user-performed gesture to modified model; and
rendering the avatar corresponding to the modified model and the gesture mapped to the modified model on a display device.

13. The method of claim 12, wherein the application of corrective data is triggered by at least one of:
comparing a variation between the data representative of the target and an error band and detecting that the variation is within the error band;
detecting an asymmetrical balance of the model representative of the user; and
comparing the data representative of the user to a virtual object and detecting a misalignment between the model of the user and the virtual object.

14. The method of claim 13, wherein the error band is defined by at least one parameter of a gesture filter that corresponds to the user-performed gesture.

15. The method of claim 12, further comprising:
applying a filter corresponding to the gesture, prior to applying the corrective data, to the received data and identifying the gesture.

16. The method of claim 12, further comprising:
identifying an intended or expected control from the data representative of the gesture, wherein the corrective data applied to the model corresponds to the identified or expected control.

17. The method of claim 12, wherein the rendered avatar corresponds to a user accuracy or a user skill setting.

18. The method of claim 12, further comprising:
identifying the user-performed gesture by comparing the digital representation of the model to a gesture filter.

19. The method of claim 12, further comprising:
providing a filter representing the gesture, the filter comprising base information about the gesture;
applying the filter to the image data and determining an output from the base information about the gesture.

20. A computer-readable storage device for adjusting a joint in a model of a target, bearing computer-readable instructions that, when executed on a computer, cause the computer to perform operations comprising:
receiving the image data of a physical space, wherein the image data includes data representative of a target in the physical space;
generating a skeletal model of the target having at least one joint, wherein the joint position corresponds to a virtual 3-dimensional coordinate system that corresponds to the physical space;
identifying a deviation of a length of a bone of the skeletal model that is too long or too short to fit in a corresponding avatar;
adjusting the length of the bone of the model to fit within the avatar; and
rendering an avatar for the target based on the adjusted length of the bone in the model.

* * * * *